United States Patent [19]

Tsuruta et al.

[11] Patent Number: 4,467,437
[45] Date of Patent: Aug. 21, 1984

[54] PATTERN MATCHING DEVICE WITH A DP TECHNIQUE APPLIED TO FEATURE VECTORS OF TWO INFORMATION COMPRESSED PATTERNS

[75] Inventors: Shichiro Tsuruta; Hiroaki Sakoe, both of Tokyo, Japan

[73] Assignee: Nippon Electric Co., Ltd., Tokyo, Japan

[21] Appl. No.: 353,293

[22] Filed: Mar. 1, 1982

[30] Foreign Application Priority Data

Mar. 6, 1981 [JP] Japan ................................. 56-32060

[51] Int. Cl.$^3$ ............................................. G10L 1/00
[52] U.S. Cl. ................................. 364/513.5; 382/30; 381/43
[58] Field of Search ..................... 381/41–50; 382/30; 364/513, 513.5

[56] References Cited
U.S. PATENT DOCUMENTS

| | | | |
|---|---|---|---|
| 4,286,115 | 8/1981 | Sakoe | 381/43 |
| 4,319,221 | 3/1982 | Sakoe | 382/30 |
| 4,412,098 | 10/1983 | An | 381/43 |

Primary Examiner—E. S. Matt Kemeny
Attorney, Agent, or Firm—Sughrue, Mion, Zinn, Macpeak and Seas

[57] ABSTRACT

This pattern matching system features the calculation of a weighting factor based on the variable interval between feature vector samples. On carrying out matching of two information compressed patterns, a weighted similarity measure calculator (64) calculates a weighted similarity measure by multiplying an intervector similarity measure between one each feature vector of the respective patterns by a weighting factor calculated by the use of a variable interval between each feature vector and a next previous one. A recurrence formula is calculated by the use of such weighted similarity measures instead of the intervector similarity measures. A predetermined value $\delta$ may be used in reducing the number of signal bits used for the recurrence formula. Preferably, a sum for the recurrence formula is restricted by two preselected values. Most preferably, an additional similarity measure is used for the recurrence formula.

29 Claims, 16 Drawing Figures

PATTERN MATCHING DEVICE WITH A DP TECHNIQUE APPLIED TO FEATURE VECTORS OF TWO INFORMATION COMPRESSED PATTERNS

BACKGROUND OF THE INVENTION

This invention relates to a pattern matching device for carrying out pattern matching between two information compressed patterns by resorting to a DP (dynamic programming) technique on calculating a similarity or likelihood measure or degree between the patterns. Each of the patterns is generally an approximation of an original pattern represented by a sequence of feature vectors and is represented by a sequence of extracted vectors positioned with variable intervals or spacings along a time axis. The extracted vectors correspond to those representative or typical ones of the feature vectors for an original pattern which are arranged at such intervals to characterize the original pattern. In other words, the extracted vectors are feature vectors representative of each information compressed pattern.

Each original pattern may be given by a spoken word or a plurality of continuously spoken words. Alternatively, the pattern may be a figure or diagram which, in turn, may be type-printed characters or hand-printed letters. The pattern matching device serves as a main structural unit of a pattern recognition system as disclosed in U.S. Pat. No. 3,816,722 issued to Hiroaki Sakoe, one of the present applicants, et al, assignors to Nippon Electric Co., Ltd., the instant assignee. The pattern matching device is useful also in a continuous speech recognition system as revealed in U.S. Pat. No. 4,059,725 issued to Hiroaki Sakoe, one of the instant applicants, and assigned to the present assignee.

The DP technique or algorithm as called in the art, is resorted to in a majority of pattern matching devices which are in actual use. In preparation for the DP technique, the original patterns are represented by a first and a second sequence of feature vectors, respectively. Each sequence consists of a certain number of feature vectors depending on the pattern represented by the sequence under consideration. An intervector similarity measure is calculated between each feature vector of the first sequence and each feature vector of the second sequence. According to a DP technique, iterative calculation is carried out on a recurrence formula for use in defining a recurrence value by an extremum of several sums which are equal to a prescribed number of previously calculated recurrence values plus at least one intervector similarity measure, respectively. The extremum is a minimum and a maximum when the intervector similarity measure is given, for example, as a distance measure and a correlation measure between the two feature vectors, respectively. The recurrence formula eventually gives an interpattern similarity measure representative of whether the two original patterns are similar or dissimilar to each other. Depending on the circumstances, the intervector similarity measure may be called an elementary or primitive similarity measure. The interpattern similarity measure may be named an overall or eventual similarity measure.

For a pattern recognition system, a plurality of reference patterns are preliminarily registered in a pattern memory as reference feature vector sequences. An unknown pattern to be recognized, is supplied to a pattern buffer as an input feature vector sequence. The unknown pattern is subjected to the pattern matching operation successively with the reference patterns. The unknown pattern is recognized to be one of the reference patterns that provides an extremum interpattern similarity measure relative to the unknown pattern.

As will later be discussed more in detail with reference to a few of about fifteen figures of the accompanying drawing, each reference feature vector sequence consists of a considerable number of feature vectors. The number is called a reference pattern duration or length. A conventional pattern matching device must therefore comprise a pattern memory of an appreciably large memory capacity. A longer time is necessary on carrying out the pattern matching operation with each reference pattern when an input pattern is either long or covers a wide area to have, in either case, a longer input pattern duration or length. The device has therefore been bulky and expensive.

To speak of speech patterns by way of example, a variation in adjacent feature vectors is little at stationary part, such as in a vowel, and considerable at a transient part, such as at a transition from a vowel to a consonant. In other words, a feature vector sequence representative of a speech pattern, usually includes an appreciable number of redundant feature vectors which carry redundant information and are interspersed in a smaller number of representative feature vectors characterizing the speech pattern. It has therefore been proposed to substitute an information compressed pattern for an original pattern. The information compressed pattern is represented by a sequence of "extracted" vectors extracted directly from the original pattern at a plurality of those "extracting" instants or points, respectively, which are placed with variable intervals of time along a time axis, namely, positioned at discrete instants. The information compressed pattern is therefore represented by a combination of the extracted vector sequence and a timing or point sequence composed of the instants. The extracted vectors correspond to the respective characteristic feature vectors. Such an information compression technique is described in, for example, an article contributed by Theodosios Pavlidis to IEEE Transactions on Computers, Volume C-22, No. 7 (July 1973), pages 689–697, under the title of "Waveform Segmentation through Functional Approximation."

It may appear at a first sight that the memory capacity and the time of calculation will be reduced by applying the DP technique to the information compression technique. The fact is, however, not.

Even if the DP technique were successfully applied to the information compression technique, a conventional pattern matching device comprises a work memory and a calculating circuit which must deal with signals having a multiplicity of bits particularly when an input extracted vector sequence is considerably long.

On the other hand, it has been known as described in an article which Fumitada Itakura contributed to IEEE Transactions on Acoustics, Speech, and Signal Processing, Volume ASSP-23, No. 1 (February 1975), pages 67–72, and is entitled "Minimum Precision Residual Principle Applied to Speech Recognition," that the speed of pattern recognition can be increased by rejecting or discontinuing the pattern matching operation in a pattern recognition system if the reference pattern being subjected to the pattern matching operation, gives a distance measure which is greater than a predetermined threshold,

SUMMARY OF THE INVENTION

It is therefore an object of the present invention to provide a pattern matching device for which a DP technique is applied to two feature vector sequences representative of two information compressed patterns, respectively.

It is another object of this invention to provide a pattern matching device of the type described, which comprises a pattern memory and a work memory of a smaller memory capacity than a conventional pattern matching device and is accordingly compact and yet inexpensive.

It is still another object of this invention to provide a pattern matching device of the type described, which can render a pattern recognition system compact and yet inexpensive.

It is an additional object of this invention to provide a pattern matching device of the type described, which is operable with signals of a relatively smaller number of bits and is thereby rendered more compact and yet inexpensive.

It is another additional object of this invention to provide a pattern matching device of the type described, in which the above-mentioned pattern rejection technique is implemented to give a pattern recognition system a higher speed of pattern recognition.

It is possible to specify that a pattern matching device to which this invention is applicable, is for calculating an overall similarity measure between a first pattern U represented by a first vector sequence of first through I-th extracted vectors positioned at first through I-th instants, respectively, which are arranged with variable intervals of time as a first timing sequence, and a second pattern V represented by a second vector sequence of first through J-th extracted vectors positioned at first through J-th instants, respectively, which are arranged with variable specings of time as a second timing sequence, and that the device comprises first means for generating first and second timing signals indicative of a pair of instants in the first and the second timing sequence at one time, respectively, with the pair varied from a (1, 1)-th pair of the first instants in the respective timing sequences eventually to an (I, J)-th pair of the I-th and the J-th instants through an (i, j)-th pair of the i-th and the j-th instants where i and j are representative of the two integers between 1 and I and between 1 and J, respectively, second means responsive to the first and the second timing signals for calculating an (i, j)-th elementary similarity measure for the i-th and the j-th extracted vectors when the first and the second timing signals are indicative of the (i, j)-th pair, and third means responsive to the first and the second timing signals and to the (i, j)-th elementary similarity measures for iteratively calculating a recurrence formula to successively give a plurality of recurrence values. The recurrence formula gives, when the first and the second timing signals are indicative of the (i, j)-th pair, an (i, j)-th one $f(i, j)$ of the recurrence values by an extremum of a plurality of results of addition which are calculated by the use of a prescribed number of previously calculated recurrence values and at least the (i, j)-th elementary similarity measure, respectively. The recurrence formula eventually gives the overall similarity measure by an (I, J)-th one $f(I, J)$ of the recurrence values.

According to this invention, the second means of the above-specified device comprises fourth means coupled to the first means for calculating, when the first and the second timing signals are indicative of the (i, j)-th pair, an (i, j)-th intervector similarity measure $d(i, j)$ between the i-th and the j-th extracted vectors and an (i, j)-th weighting factor $w(i, j)$ by the use of the interval of time from the (i-1)-th instant to the i-th instant, and fifth means coupled to the fourth means for calculating, when the fourth means calculates the (i, j)-th intervector similarity measure and the (i, j)-th weighting factor, the (i, j)-th elementary similarity measure.

Each result of addition for each recurrence value, such as the (i, j)-th recurrence value $f(i, j)$, may directly be given by a sum of one of the previously calculated recurrence values and either the (i, j)-th elementary similarity measure or another elementary similarity measure as will later be described in detail. Alternatively, the result of addition may somewhat indirectly be given by such a sum.

According to as aspect of this invention, the fifth means of the device according to this invention calculates, when the fourth means calculates the (i, j)-th intervector similarity measure, an (i, j)-th weighted similarity measure $d_w(i, j)$ as the (i, j)-th elementary similarity measure by multiplying the (i, j)-th intervector similarity measure $d(i, j)$ by the (i, j)-th weighting factor $w(i, j)$. In this event, the overall similarity measure is equal to an interpattern similarity measure $D(U, V)$ representative of whether the first and the second patterns U and V are similar or dissimilar to each other.

Under usual circumstances, the first means of a conventional pattern matching device generates the first and the second timing signals with the first timing signal rendered ascendingly consecutively indicative of the first through the I-th instants. The second timing signal is successively rendered indicative of a plurality of ascendingly consecutive instants of the second timing sequence within each of the intervals of time during which the first timing signal indicates one of the instants of the first timing sequence. It is to be noted that the first and the second timing sequences used in such a conventional device, are indicative of equally spaced instants rather than the extracting instants of the type described heretobefore.

Three is often used as the prescribed number. When the first and the second timing signals are indicative of the (i, j)-th pair, the third means for use in the conventional device under the usual circumstances, calculates the recurrence formula with three results of addition calculated by the use of the (i-1, j)-th, the (i-1, j-1)-th, and the (i-1, j-2)-th recurrence values as the previously calculated recurrence values, three in number, respectively.

For use under the usual circumstances, the three results of addition may be given in the device according to the aspect described above, when the first and the second timing signals are indicative of the (i, j)-th extracting instant pair, by three sums which are equal to the three previously calculated recurrence values plus the (i, j)-th weighted similarity measure $d_w(i, j)$, respectively.

More preferably, the second means for use in the device according to the above-mentioned aspect of this invention under the usual circumstances with three selected for the prescribed number, further comprises sixth means coupled to the first means for calculating, when the first and the second timing signals are indicative of the (i, j)-th pair, j-th and (j-1)-th intervector spacings of the second timing sequence $t_j$ and $t_{j-1}$ by two differences which are equal to the j-th instant q(j) minus the (j-1)-th instant q(j-1) and to the (j-1)-th instant minus the (j-2)-th instant q(j-2), respectively. The fifth means is further coupled to the sixth means for additionally calculating, when the fourth means calculates the (i, j)-th intervector similarity measure an (i, j)-th additional similarity measure $d_a(i, j)$ by a linear combination of the (i, j)-th and the (i, j-1)-th intervector similarity measures d(i, j) and d(i, j-1) to which the (i, j)-th weighting factor w(i, j) is proportionally distributed in proportion to the j-th and the (j-1)-th intervector spacings.

It is also preferred under the usual circumstances and in the case where three is used as the prescribed number that the fifth means of the above-described aspect of this invention is for additionally calculating, when the fourth means calculates the (i, j)-th intervector similarity measure, an (i, j)-th additional similarity measure $d_a(i, j)$ by a linear combination of the (i, j)-th and the (i, j-1)-th intervector similarity measures d(i, j) and d(i, j-1), each of which is multiplied by a half of the (i, j)-th weighting factor w(i, j).

In either of the preferred cases, the third means calculates the three results of addition, when the first and the second timing signals are indicative of the (i, j)-th pair, by two sums which are equal to the (i-1, j)-th and the (i-1, j-1)-th recurrence values f(i-1, j) and f(i-1, j-1) plus the (i, j)-th weighted similarity measure $d_w(i, j)$, respectively, and a sum which is equal to the (i-1, j-2)-th recurrence value f(i-1, j-2) plus the (i, j)-th additional similarity measure $d_a(i, j)$.

According to another aspect of this invention, the second means of the device according to this invention further comprises subtracting means coupled to the fourth means for calculating, when the fourth means calculates the (i, j)-th intervector similarity measure, an (i, j)-th compensated similarity measure d'(i, j) by subtracting a predetermined value δ from the (i, j)-th intervector similarity measure d(i, j). The fifth means is further coupled to the subtracting means for calculating, when the subtracting means calculates the (i, j)-th compensated similarity measure, an (i, j)-th compensated and weighted similarity measure $d_w'(i, j)$ as the (i, j)-th elementary similarity measure by multiplying the (i, j)-th compensated similarity measure d'(i, j) by the (i, j)-th weighting factor w(i, j). In this event, the overall similarity measure is related to the interpattern similarity measure D(U, V) of the above-mentioned type.

The third means of a pattern matching device according to the later-mentioned aspect of this invention preferably comprises means responsive to the first and the second timing signals and the (i, j)-th elementary similarity measures for calculating, when the first and the second timing signals are indicative of the (i, j)-th pair and consequently when the recurrence formula gives the (i, j)-th recurrence value f(i, j), a plurality of sums of an (i, j)-th group which are equal to the previously calculated recurrence values of the prescribed number plus at least the (i, j)-th compensated and weighted similarity measure $d_w'(i, j)$, respectively, means responsive to the sums of the (i, j)-th group for producing an overflow signal which takes first, second, and third signal values when each of the sums of the (i, j)-th group is greater than a first preselected value, is less than a second preselected value, and is an (i, j)-th restricted sum which, in turn, is neither greater than the first preselected value nor less than the second preselected value, respectively, and means responsive to the overflow signal for providing each of the results of addition by the first and the second preselected values and the (i, j)-th restricted sum when the overflow second takes the first through the third signal values, respectively. The technique implemented by the overflow signal producing means and the result of sum restricting means will be referred to as a sum restricting scheme.

In a device according to the later-described aspect of this invention, the compensated and weighted similarity measures $d_w'(i, j)$'s are substituted for the merely weighted similarity measures $d_w(i, j)$'s on calculating the recurrence formula under the usual circumstances with three used for the prescribed number. Likewise, compensated additional similarity measures $d_a'(i, j)$'s calculated by the use of the compensated similarity measures d'(i, j)'s instead of the intervector similarity measures d(i, j)'s are substituted for the mere additional similarity measures $d_a(i, j)$'s.

According to still another aspect of this invention, the device according to this invention is used under the usual circumstances with three used as the prescribed number. The second means of such a device further comprises sixth means coupled to the first means for calculating, when the first and the second timing signals are indicative of the (i, j)-th pair, j-th and (j-1)-th intervector spacings in the second timing sequence $t_j$ and $t_{j-1}$ by subtracting the (j-1)-th instant from the j-th instant and by subtracting the (j-2)-th instant from the (j-1)-th instant, respectively, and seventh means coupled to the fourth means for calculating, when the fourth means calculates the (i, j)-th weighting factor, an (i, j)-th compensation factor by multiplying the (i, j)-th weighting factor w(i, j) by a predetermined value δ. The fifth means is further coupled to the sixth means for calculating, when the fourth means calculates the (i, j)-th intervector similarity measure, an (i, j)-th weighted similarity measure $d_w(i, j)$ by multiplying the (i, j)-th intervector similarity measure d(i, j) by the (i, j)-th weighting factor w(i, j) and an (i, j)-th additional similarity measure $d_a(i, j)$ by a linear combination of the (i, j)-th and the (i, j-1)-th intervector similarity measures d(i, j) and d(i, j-1) to which the (i, j)-th weighting factor w(i, j) is proportionally distributed in proportion to the j-th and the (j-1)-th intervector spacings $t_j$ and $t_{j-1}$, respectively. The fifth means is still further coupled to the seventh means for subtracting the (i, j)-th compensation factor from the (i, j)-th weighted similarity measure and the (i, j)-th additional similarity measure to provide an (i, j)-th compensated and weighted similarity measure $d_w'(i, j)$ as the (i, j)-th elementary similarity measure and an (i, j)-th compensated additional similarity measure $d_a'(i, j)$, respectively. The third means uses the compensated and weighted similarity measures $d_w'(i, j)$'s and the compensated additional similarity measures $d_a'(i, j)$'s instead of the merely weighted similarity measures $d_w(i, j)$'s and the mere additional similarity measures $d_a(i, j)$'s, respectively.

With the last-mentioned device, the overall similarity measure is again related to the interpattern similarity measure D(U, V). If desired, the former is readily converted to the latter.

The sum restricting scheme is readily applicable to a device according to the last-described aspect of this invention. The scheme is equally well applicable to a device according to the first-mentioned aspect of this invention. It is easy to resort to the above-mentioned pattern rejection technique with a device in which the sum restricting scheme is implemented.

DESCRIPTION OF THE PREFERRED EMBODIMENTS

Figure 1:
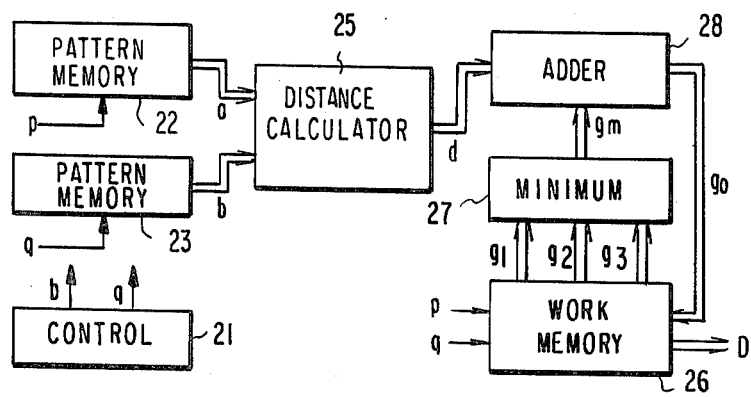
FIG. 1 is a block diagram of a conventional pattern matching device.

Referring to FIG. 1, a pattern matching device illustrated in the above-referenced Sakoe patent of U.S. Pat. No. 4,059,725 with reference to FIG. 6 thereof, will be described at first as an example of conventional pattern matching devices in order to facilitate an understanding of the present invention. Merely for simplicity of description, it will be assumed in the following that the pattern matching device is for use in a speech recognition system. Also, an interpattern distance $D(A, B)$ between first and second patterns A and B will be used as an interpattern similarity measure between the patterns A and B on carrying out the pattern matching operation. Furthermore, vectors OVS/a/, OVS/u/, and the like will be denoted by corresponding usual letters, such as a and u. As the case may be, the first and the second patterns A and B will be referred to as an input and a reference pattern, respectively.

It is known in the art to represent the input pattern A by a first time sequence of first through P-th input or first pattern feature vectors $a_1, a_2, \ldots, a_p, \ldots,$ and $a_P$, where $a_p$ represents a p-th input pattern feature vector representative of a speech sample which is sampled directly from the input pattern A with a predetermined sampling period of, typically, ten milliseconds at a p-th instant p. Each feature vector is given by a plurality of vector components, such as ten vector components, as a multi-dimensional vector. The reference pattern B is represented by a second time sequence of first through Q-th reference or second pattern feature vectors $b_1, b_2, \ldots, b_q, \ldots,$ and $b_Q$, where $b_q$ designates a q-th reference pattern feature vector representative of a speech sample which is sampled with the predetermined sampling period at a q-th instant q. The p-th and the q-th instants may also be called a p-th input and a q-th reference pattern sampling point. The first and the second time sequences have first and second total durations or lengths P and Q. It is possible to understand that the first and the second time sequences are arranged along first and second time axes p and q (the same reference letters being thus often used merely for simplicity of denotation), respectively.

The pattern matching device comprises a control unit 21 for producing first and second address or timing signals p and q representative, at one time, of one of integers 1 through P of a first set and one of integers 1 through Q of a second set, respectively. A (p, q)-th integer pair (p, q) of a p-th integer p of the first set and a q-th integer q of the second set is for use, among others, in designating the p-th input and the q-th reference pattern feature vectors. The control unit 21 furthermore produces various control signals for use in controlling other parts of the device. Such control signals are not depicted in the figure being referred to. A pattern buffer 22 is for holding a predetermined number of the input pattern feature vectors at a time. Responsive to the first address signal p, the pattern buffer 22 produces a first vector signal a representative of the input pattern feature vectors designated by the integers p's of the first set. A pattern memory 23 is for holding the second time sequence or sequences. Supplied with the second address signal q, the pattern memory 23 produces a second vector signal b representative of the reference pattern feature vectors which are designated by the integers q's of the second set and by a pattern specifying signal produced by the control unit 21 as one of the control signals to specify one of the second time sequences if the pattern memory 23 is loaded with a plurality of the second time sequences. The pattern buffer 22 and the pattern memory 23 may also be called first and second pattern memories or buffers, respectively.

Responsive to the first and the second vector signals a and b representative of the p-th input pattern feature vector $a_p$ and q-th reference pattern feature vector $b_q$, a distance calculator 25 calculates an intervector distance $d(p, q)$ between the vectors $a_p$ and $b_q$ to produce a distance measure signal d successively representative of such calculated distances. As will later be described more in detail, the successively calculated intervector distances $d(p, q)$'s are for use in calculating the interpattern distance $D(A, B)$.

On calculating an interpattern similarity measure in general, it is very desirable to map or warp the first and the second time axes p and q relative to each other as discussed in an article which Hiroaki Sakoe, one of the present applicants, et al contributed to IEEE Transactions on Acoustics, Speech, and Signal Processing, Volume ASSP-26, No. 1 (February 1978), pages 43-49, under the title of "Dynamic Programming Algorithm Optimization for Spoken Word Recognition." This is for compensating for or normalizing those fluctuations along the time axes which usually occur, in the case of speech patterns, from the nonuniformity of utterance. By way of example, the interpattern distance is calculated in compliance with:

$$D(A, B) = \min_{q=q(p)} \left[ \sum_{p=1}^{P} d(p, q) \right], \quad (1)$$

where $q=q(p)$ represents a mapping or warping function for mapping the second time axis q to the first time axis p. It is known in the art that $q(1)$ is equal to 1 and $q(P)$, to Q. According to Equation (1), the intervector distances are summed up from a starting or first integer pair (1, 1) up to an ultimate or (P, Q)-th integer pair (P, J) with the integer p of the first set ascendingly consecutively varied and with the integer q of the second set varied according to such a mapping function $q=q(p)$. Despite the fact that the patterns A and B are sampled with the predetermined sampling period, the integers q's indicative of the reference pattern sampling points are varied at a rate much faster than the variations in the integers p's. This is merely for convenience for applying a DP technique to the pattern matching operation. The summations are calculated for various mapping functions. Equation (1) represents the fact that the interpattern distance is given by a minimum of such summations. The minimum occurs when the intervector distances are summed up along an optimum mapping function $q=\hat{q}(p)$.

In compliance with the dynamic programming technique, the right-hand side of Equation (1) is minimized by iteratively calculating a recurrence formula which defines a recurrence value by a sum of each intervector distance and an extremum of a prescribed number of previous recurrence values which, in turn, are already calculated before calculation of the recurrence formula for a new recurrence value. When an asymmetric three-freedom form or scheme as called in the art is resorted to, the recurrence formula is given by:

$$g(p, q) = d(p, q) + \min\begin{bmatrix} g(p-1, q) \\ g(p-1, q-1) \\ g(p-1, q-2) \end{bmatrix}, \quad (2)$$

where $g(p, q)$ will be named a (p, q)-th recurrence value. Starting at an initial condition for the starting pair (1, 1):

$$g(1, 1) = d(1, 1),$$

the recurrence formula (2) is calculated with the first address signal made to indicate ascendingly consecutive integers p's of the first set and with the second address signal made to successively indicate a plurality of ascendingly consecutive integers q's of the second set within an interval of time during which the first address signal indicates each integer of the first set. It is sufficient that the integers q's of the second set be varied for each integer p of the first set in compliance with an adjustment window condition:

$$p - r \leq q \leq p + r,$$

where r represents a preselected positive integer known as a window length in the art. In this event, it is preferred that the distance calculator 25 (FIG. 1) successively calculate the intervector distances between each input pattern feature vector and a plurality of reference pattern feature vectors which are in a range conditioned by the adjustment window for the input pattern feature vector under consideration. When the recurrence formula (2) is eventually calculated up to the ultimate pair (P, Q), the interpattern distance is given by:

$$D(A, B) = g(P, Q).$$

Figure 2:
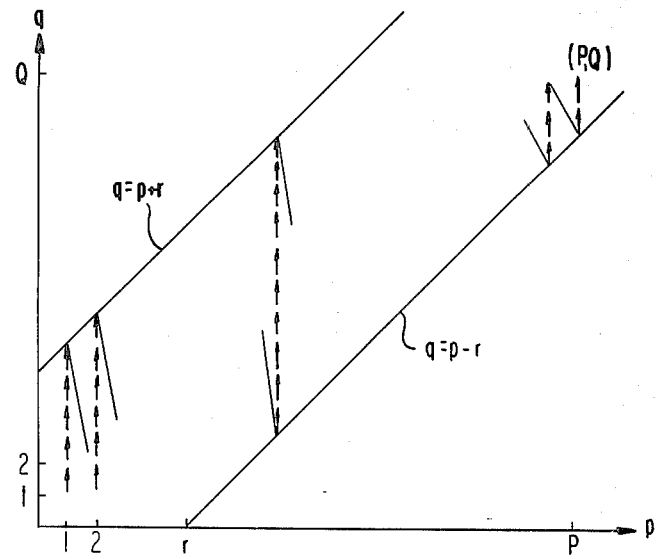
FIG. 2 exemplifies an adjustment window, known in the art, for the device illustrated in FIG. 1.

Referring to FIG. 2 for a short while, an adjustment window is illustrated on a p-q coordinate plane defined by the first and the second time axes p and q which are depicted as a pair of orthogonal coordinate axes merely for clarity of illustration. The integers q's of the second set are varied in the adjustment window for each integer p of the first set as exemplified by thick lines with arrowheads. When substantially real time recognition of an input speech pattern is necessary, the above-mentioned interval of time should be equal to the sampling period with which the input speech pattern is sampled so that the input pattern feature vectors are successively supplied to the pattern buffer 22 (FIG. 1).

Referring back to FIG. 1, a work memory or operational register 26 has a plurality of addresses, such as addresses (1, 1) to (r, 1), (1, r) to (r, 2r), (P−2r, Q−r) to (P, Q−r), and (P−r, Q) to (P, Q) in the adjustment window exemplified in FIG. 2. The addresses are accessible by pairs of the integers indicated by the first and the second address signals p and q. At first, the initial condition is set in the work memory 26 at the address (1, 1) as will become clear as the description proceeds. When the address signals are indicative of the (p, q)-th integer pair (p, q), the work memory 26 is already loaded with those previous recurrence values at pertinent addresses which are previously calculated according to the recurrence formula (2). Responsive to the address signals indicative of the (p, q)-th integer pair, the work memory 26 produces three signals $g_1$, $g_2$, and $g_3$ from the addresses (p−1, q), (p−1, q−1), and (p−1, q−2). The three signals are representative of three previous recurrence values for use in minimization of the recurrence formula (2).

Supplied with the three signals $g_1$ through $g_3$, a minimum deciding circuit 27 finds a minimum of the three previous recurrence values to produce a minimum representing signal $g_m$ successively representative of such minima, namely, the second term in the right-hand side of the recurrence formula (2). Incidentally, it is known in the art that the work memory 26 should produce a sufficiently great value as any one of the three previous recurrence values when the accessed address lies outside of the adjustment window.

Responsive to the distance measure signal d and the minimum representing signal $g_m$, an adder 28 calculates a sum of the intervector distance and the minimum to produce a sum signal $g_o$ successively representative of such sums. When the first and the second address signals are indicative of the (p, q)-th integer pair (p, q), the sum gives the (p, q)-th recurrence value $g(p, q)$. The sum signal representative of the (p, q)-th recurrence value is supplied back to the work memory 26 and stored in the address (p, q) as a new recurrence value by a write-in signal (not shown) produced by the control unit 21 as one of the control signals. The recurrence values represented by the sum signal $g_o$ previously of the currently calculated (p, q)-th recurrence value, are already stored in the work memory 26 as the previous recurrence values. When the input pattern A comes to an end, the control unit 21 keeps the first address signal p indicative of the P-th integer P as described in, for example, U.S. Pat. No. 4,049,913 issued to Hiroaki Sakoe, one of the present applicants, and assigned to the instant assignee. When the second address signal becomes indicative of the Q-th integer Q in the meantime, the work memory 26 produces an interpattern similarity measure signal D representative of the interpattern distance D(A, B).

As pointed out hereinabove, the pattern memory 23 must have an appreciably large memory capacity. This applies to the work memory 26. When the input pattern A has a longer total duration P, an accordingly longer time is necessary on carrying out the pattern matching operation relative to each reference pattern B.

Figure 3:
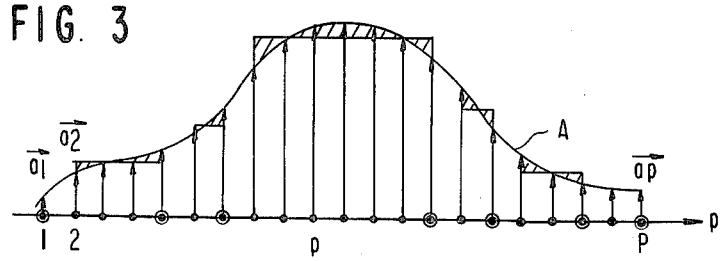
FIG. 3 is a diagram for use in describing the relationship between an original pattern and an information compressed pattern derived therefrom.

Turning now to FIG. 3, a sequence of one-dimensional feature "vectors" is depicted. The sequence of first through P-th feature vectors $a_1$ to $a_P$ are positioned at first through P-th instants 1 to P which are equally spaced along a time axis p and are indicated by dots. The sequence represents an original pattern A illustrated by a curve. The original pattern A varies at several of the intervals with those rates of variation which exceed a predetermined threshold. According to the information compression technique mentioned heretobefore, the original pattern A is approximated by a plurality of discrete rectangles, each of which has a base on the time axis p between two of the instants p's.

At the starting point of the original pattern A, the illustrated rectangle is specific and is represented by a mere line segment. A trailing end of each base is indicated by encircled dots. The rectangles are selected according to the multistep method, known in the art, so as to minimize errors (indicated by hatched areas) relative to the curve. It is thus possible to define the extracted vectors described before, by those upright sides of the respective rectangles which reach the trailing ends, respectively, and are representative of characteristic or typical feature vectors of the original pattern A. The extracting instants described hereinabove, are defined by the trailing ends. In general, the extracting instants are nonuniformly distributed along the time axis p. When the original pattern A is represented by the extracted vectors, redundant feature vectors which are interspersed between the characteristic feature vectors, are omitted or skipped over. Although the information as regards the original pattern A is thus successfully compressed, it has been impossible to apply the DP technique to an information compressed pattern defined by the discrete rectangles. Incidentally, the information compressed pattern may exactly be coincident with the original pattern A in a special case.

Figure 4:
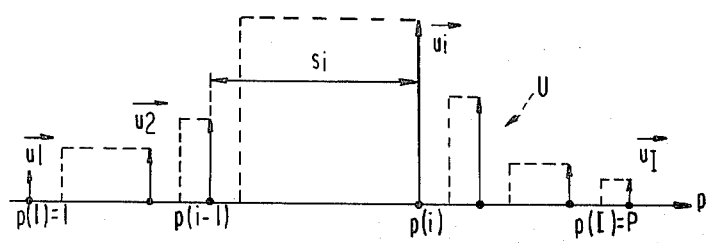
FIG. 4 is a diagram for use in describing the relationship between a few extracting instants and a plurality of representative feature vectors which can directly be extracted at the respective extracting instants from an original pattern of the type exemplified in FIG. 3.

Turning further to FIG. 4, the discrete rectangles are again depicted by dashed lines, together with first through I-th extracted vectors $u_1, u_2, \ldots, u_i, \ldots,$ and $u_I$ positioned along the time axis p at first through I-th extracting instants p(1), ..., p(i−1), p(i), ..., and p(I), respectively. Although the serial numbers i's for the respective extracting instants are given by ascendingly consecutive natural numbers, intervals of time between pairs of two consecutive extracting instants, such as p(i−1) and p(i), are variable, namely, not necessarily equal to each other. The discrete rectangles are representative of an information compressed pattern U.

For a pattern matching device, a first or input information compressed pattern U exemplified in FIG. 4, is represented by a first or input vector sequence Ev(U) of first through I-th input pattern extracted vectors, I in number, and a first or input timing or point sequence Ep(U) of first through I-th input pattern extracting instants for the respective extracted vectors as follows:

$$Ev(U) = u_1, u_2, \ldots, u_i, \ldots, u_I, \quad (3)$$

and $$Ep(U) = p(1), p(2), \ldots, p(i), \ldots, p(I), \quad (4)$$

where $u_i$ and p(i) are representative of an i-th input pattern extracted vector and an i-th input pattern extracting instant. A second or reference information compressed pattern V is likewise represented by a second or reference vector sequence Ev(V) of first through J-th reference pattern extracted vectors and a second or reference timing sequence Ep(V) of first through J-th reference pattern extracting instants as follows:

$$Ev(V) = v_1, v_2, \ldots, v_j, \ldots, v_J, \quad (5)$$

and $$Ep(V) = q(1), q(2), \ldots, q(j), \ldots, q(J), \quad (6)$$

where $v_j$ and q(j) are indicative of a j-th reference pattern extracted vector and a j-th reference pattern extracting instant. The numbers I and J are related to the input and the reference pattern durations P and Q for the original input and reference patterns A and B. When an information compression rate defined by a ratio of the number I of extracted vectors of an information compressed pattern to the number P of all feature vectors of an original pattern for the information compressed pattern under consideration, is preliminarily selected, the number I is known from the original pattern duration P.

It is possible to use, instead of each of the timing sequences defined by Equations (4) and (6), another timing sequence of intervals or spacings between each pair of two consecutive extracting instants. Such sequences are:

$$Ei(U) = s_1, s_2, \ldots, s_i, \ldots, s_I, \quad (7)$$

and $$Ei(V) = t_1, t_2, \ldots, t_j, \ldots, t_J, \quad (8)$$

where $s_i$ (FIG. 4) and $t_j$ will be called an i-th input pattern intervector interval and a j-th reference pattern intervector spacing and are equal to [p(i)−p(i−1)] and [q(j)−q(q−1)]. The first elements $s_1$ and $t_1$ in the respective sequences are representative of p(1) and q(1). If the first information compressed pattern U is coincident with the second information compressed pattern V except for the fluctuations along the time axes and when the second time axis is mapped to the first time axis by an optimum mapping function j=ĵ(i), $s_i = t_{\hat{j}(i)}$.

Figure 5:
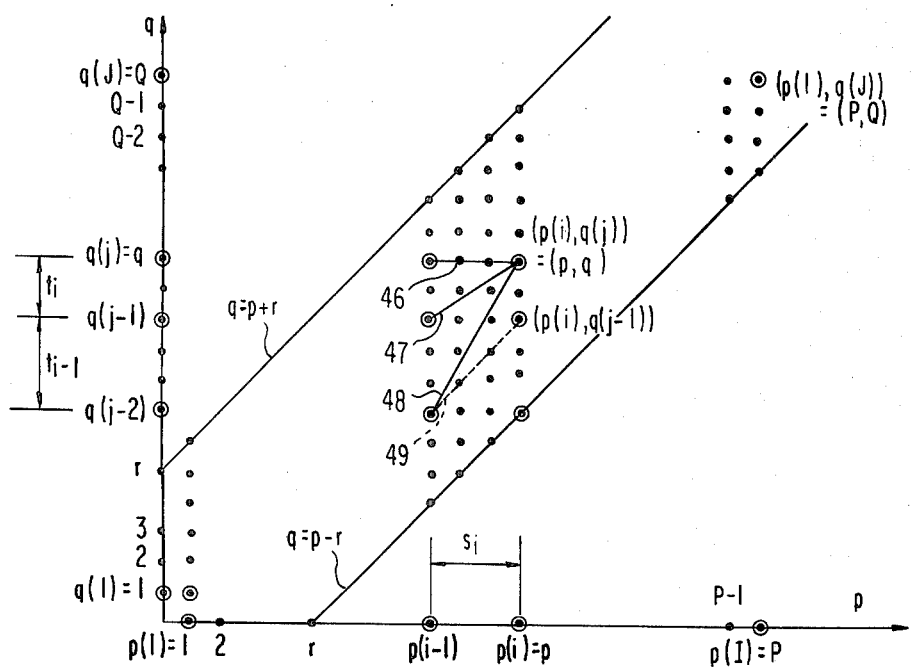
FIG. 5 shows an adjustment window for use in describing the principles on which a pattern matching device according to the instant invention is based.

Referring to FIG. 5, some of the sampling instants p's for an original input pattern A are indicated by mere dots on the p-q plane along the abscissa representative of the first time axis p and some of the sampling instants q's for an original reference pattern B, also mere dots along the ordinate representative of the second time axis q. A few of the extracting instants p(i)'s for an input information compressed pattern U approximating the original input pattern A are exemplified by encircled dots along the abscissa and several of the extracting instants q(j)'s for a reference information compressed pattern V approximating the original reference pattern B, again by encircled dots along the ordinate. One of the input pattern intervector intervals $s_i$'s and a few of the reference pattern intervector spacings $t_j$'s are labelled along the respective coordinate axes. Each point (p, q) defined in an adjustment window by a (p, q)-th integer pair of the p-th and the q-th integers p and q of the first and the second sets, is indicated also by a mere dot and each point (p(i), q(j)) specified by an (i, j)-th instant pair of the i-th and the j-th extracting instants p(i) and q(j) for the respective information compressed patterns U and V, again by an encircled dot.

If the recurrence formula (2) were calculated by mere substitution of the extracting instants p(i)'s and q(j)'s for the integers p's and q's of the respective sets, the result would widely be different from the interpattern distance D(A, B) between the original patterns A and B. This is because attention is directed solely by the intervector distances between the extracted vectors, such as $u_i$ and $v_j$, at points indicated by the encircled dots and not to the intervector distances between the omitted or skipped over feature vectors at those of the integer pairs (p, q)'s which are indicated by the mere dots.

It is possible to approximately regenerate the original pattern when an extracted vector at each extracting instants, such as the i-th extracted vector at the i-th extracting instant, is weighted by a corresponding one of intervals of time reaching the extracting instant in question from a next previous extracting instant. For the i-th extracted vector $u_i$, the corresponding interval of time is defined by the i-th intervector interval $s_i$ or [p(i)−p(i−1)]. Stated otherwise, an interpattern distance D(U, V) between the information compressed patterns U and V is calculated to approximate the interpattern distance D(A, B) between the original patterns A and B if the recurrence formula (2) is calculated with the extracted vectors weighted by the corresponding intervals of time and likewise corresponding spacings of time. The recurrence formula (2) need not be calculated with respect to all integer pairs (p, q)'s in the adjustment window for the original patterns A and B but only as regards the extracting instant pairs (p(i), q(j))'s for the information compressed patterns U and V.

In the following, it will be assumed merely for simplicity of description that the starting and the ultimate pairs for the information compressed patterns U and V are coincident with the starting and the ultimate pairs for the original patterns A and B. That is, the description will proceed under an assumption such that p(1)=1, p(I)=P, q(1)=1, and q(J)=Q. The recurrence formula is generally rewritten into:

$$g(i,j) = d_w(i,j) + \min\begin{bmatrix}g(i-1,j)\\g(i-1,j-1),\\g(i-1,j-2)\end{bmatrix}, \quad (9)$$

where g(i, j) will be called an (i, j)-th recurrence value an $d_w(i, j)$, an (i, j)-th weighted distance. The weighted distances are given by:

$$d_w(i,j)=[w(i,j)][d(i,j)], \quad (10)$$

where w(i, j) represents an (i, j)-th weighting factor for weighting an (i, j)-th intervector distance d(i, j) between the i-th input pattern extracted vector $u_i$ and the j-th reference pattern extracted vector $v_j$ so that the patterns regenerated from the information compressed patterns U and V, may become well coincident with the respective original patterns A and B.

The (i, j)-th weighting factor for use in the recurrence formula (9) may be equal to the i-th input pattern intervector intervals $s_i$. In this event, the weighted distance $d_w(i, j)$ is equal to an intervector distance d(p, q) used in the recurrence formula (2) if an interval from the (i−1)-th instant to the i-th instant $s_i$ for the i-th input pattern extracted vector $u_i$, is equal to the sampling period. The weighting factor w(i, j) is equal to unity. If, for example, the i-th input pattern intervector interval $s_i$ is equal to ten sampling periods for the original input pattern A, the (i, j)-th weighted distance is equal to ten times the (i, j)-th intervector distance d(i, j). The weighting factor w(i, j) is now equal to ten.

In view of the assumption, the initial condition is given by:

$$g(1, 1)=d(1, 1)$$

where d(1, 1) now represents the intervector distance between the first input pattern extracted vector $u_1$ and the first reference pattern extracted vector $v_1$. The recurrence formula (9) should iteratively calculated from i=1 eventually up to i=I through consecutive integers. The interpattern distance is given by:

$$D(U, V)=g(I, J),$$

and the adjustment window, by:

$$p(i)-r \leq q(j) \leq p(i)+r. \quad (11)$$

It is possible to understand that the calculation of the recurrence formula (9) is equivalent to regeneration of the original patterns A and B with interporation of the omitted redundant feature vectors carried out by the use of the extracted vectors $u_i$'s and $v_j$'s and of the corresponding intervector intervals $s_i$'s. Furthermore, the interpattern distance is calculated with a second time axis j mapped to a first time axis i according to an optimum mapping function j=ĵ(i) by the use of a DP technique. Incidentally, the right-hand side of the recurrence formula (9) is equivalent to minimization of three sums which are equal to the previous recurrence values g(i−1, j), g(i−1, j−1), and g(i−1, j−2) plus the weighted intervector distance $d_w(i, j)$.

Figure 6:
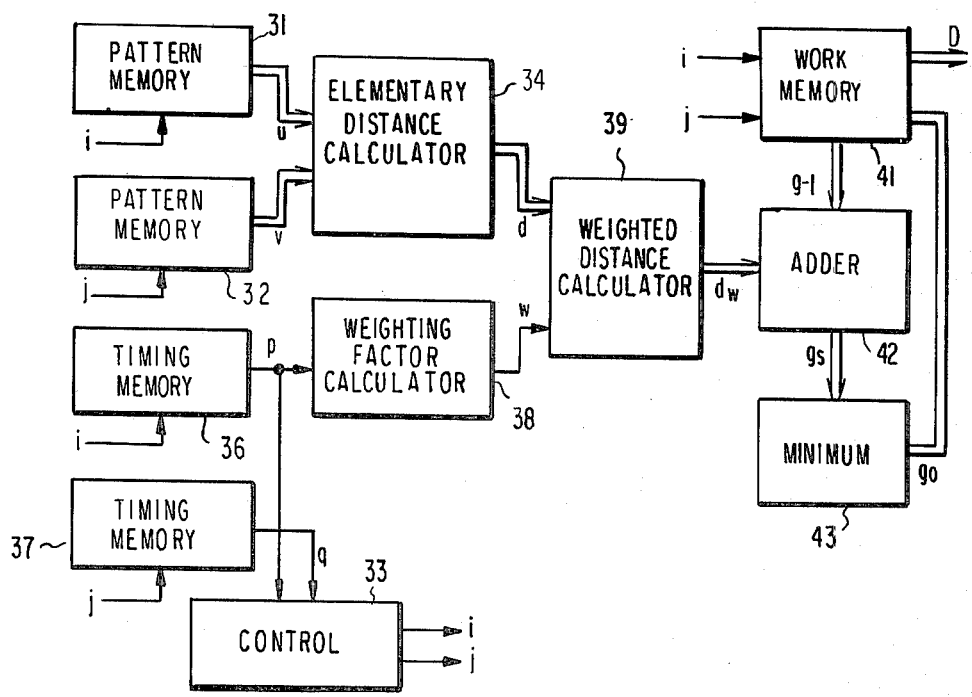
FIG. 6 is a block diagram of a pattern matching device according to a first embodiment of this invention.

Referring to FIG. 6, a pattern matching device according to a first embodiment of this invention comprises a first pattern memory 31 for holding the input pattern extracted vectors $u_i$'s of the type given by Equation (3) in consecutive addresses. A second pattern memory 32 is for likewise holding the reference pattern extracted vectors $v_j$'s of the type of Equation (5). A control unit 33 is for generating first and second address or timing signals i and j and various control signals as described in conjunction with FIG. 1. The first address signal indicates first through I-th integers 1 to I of a first set rather than the input pattern extracting instants p(1) through p(I). This applies to the second address signal indicative of first through J-th integers 1 to J of a second set. The first and the second address signals are thus generated for use in calculating the recurrence formula (9) under the usual circumstances of the type described heretobefore. Each set, however, consists of a considerably smaller number of integers than the set mentioned in connection with FIGS. 1 and 2.

Responsive to the first address signal i, the first pattern memory 31 produces a first vector signal u. When the first address signal indicates an i-th integer i, the first vector signal represents the i-th input pattern extracted vector $u_i$. When the second address signal indicates a j-th integer j, a second vector signal v produced by the second pattern memory 32 represents the j-th reference pattern extracted vector $v_j$. Supplied with the vector signals u and v, an elementary distance calculator 34 calculates an (i, j)-th intervector distance d(i, j) between the i-th input pattern extracted vector $u_i$ and the j-th reference pattern extracted vector $v_j$ when the vector signals are representative of such vectors $u_i$ and $v_j$. The distance calculator 34 produces a distance measure signal d representative of the successively calculated intervector distances.

First and second timing memories 36 and 37 are for holding the input and the reference pattern extracting instants p(i)'s and q(j)'s of Equations (4) and (6), respectively. Responsive to the first address signal i, the first timing memory 36 produces a first instant signal p which represents the i-th input pattern extracting instant p(i) when the first address signal indicates the i-th integer i. When the second address signal indicates the j-th integer j, a second instant signal q produced by the second timing memory 37 represents the j-th reference pattern extracting instant q(j). The integer pairs (i, j)'s and the extracting instants pairs (p(i), q(j))'s are thus in one-to-one correspondence.

As will later be described more in detail, a weighting factor calculator 38 of the device being illustrated, is supplied with the first instant signal p and successively calculates the weighting factors w(i, j)'s, which are now equal to the input pattern intervector intervals $s_i$'s, respectively. A weighting factor signal w produced by the factor calculator 38 represents the (i, j)-th weighting factor w(i, j) when the instant signal p represents the i-th input pattern extracting instant p(i).

The distance measure signal d and the weighting factor signal w are delivered to a weighted distance calculator 39, which successively calculates the weighted distances $d_w(i, j)$'s in compliance with Equation (10). The weighted distance calculator 39 is a mere multiplier for the time being, and produces a weighted distance signal $d_w$ representative of the successively calculated weighted distances. When the first and the second address signals are indicative of the (i, j)-th integer pair (i, j), the weighted distance signal $d_w$ represents the (i, j)-th weighted distance $d_w(i, j)$. Circuitry for producing the vector sequences Ev(U) and Ev(V) and either the timing sequences Ep(U) and Ep(V) or the timing sequences Ei(U) and Ei(V) will not be described because the circuitry is known in the art and is outside of the scope of this invention.

Figure 7:
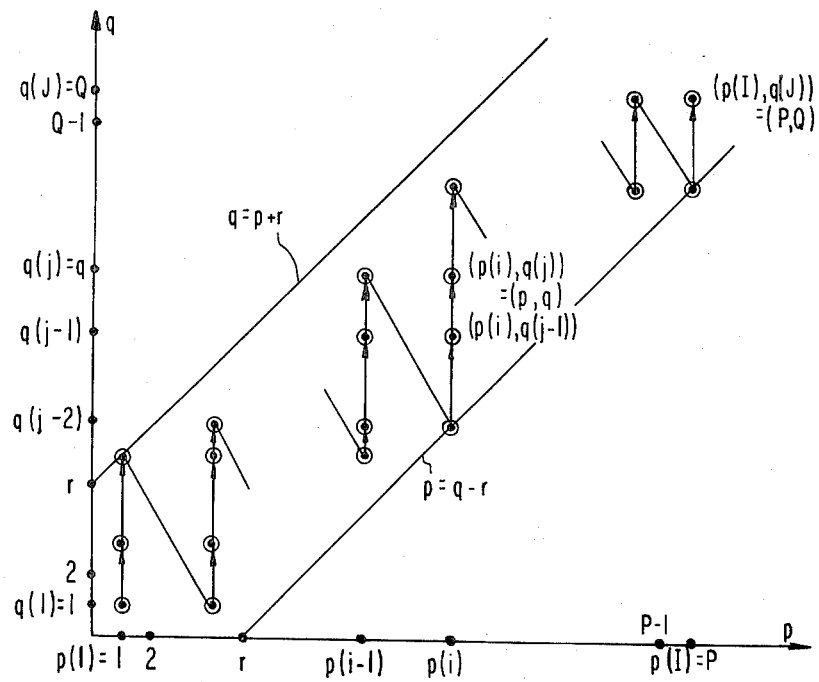
FIG. 7 shows an adjustment window for the device depicted in FIG. 6.

Turning temporarily to FIG. 7, an adjustment window is depicted again on the p-q plane. When the integer indicated by the first address signal i is varied from 1 up to I, the first through the I-th input pattern extracting instants p(1) to p(I) are ascendingly consecutively designated. Within an interval of time during which each input pattern extracting instant p(i) is designated, the integer indicated by the second address signal j is varied so as to successively designate a plurality of ascendingly consecutive reference pattern extracting instants q(j)'s conditioned by Equation (11). As exemplified in the figure, the equality in Equation (11) does not always hold. Responsive to the first and the second instant signals p and q, the control unit 33 (FIG. 6) produces the first and the second address signals i and j so that the instant signals p and q produced by the timing memories 36 and 37 may successively designate a plurality of extracting instant pairs from the (1, 1)-th pair (p(1), q(1)) eventually up to the (I, J)-th pair (p(I), q(J)) in a staggering manner exemplified in the figure being referred to.

Turning back to FIG. 6, a work memory 41 has a plurality of addresses like the work memory 26 used in the device illustrated with reference to FIG. 1. The memory 41 may, however, have a much less number of addresses than the memory 26 because the integers I and J are considerably less than the integers P and Q. It is preferred that the work memory 41 be capable of producing a previous recurrence value signal $g_{-1}$ which successively represents, when the first and the second address signals i and j are indicative of the (i, j)-th integer pair (i, j), three previous recurrence values $g(i-1, j)$, $g(i-1, j-1)$, and $g(i-1, j-2)$ rather than substantially concurrently. An adder 42 is supplied with the previous recurrence value signal $g_{-1}$ and the weighted distance signal $d_w$ and produces a sum signal $g_s$. When the address signals are indicative of the (i, j)-th integer pair, the sum signal successively represents three sums which are equal to the (i, j)-th weighted distance $d_w(i, j)$ plus the three previous recurrence values $g(i-1, j)$, $g(i-1, j-1)$, and $g(i-1, j-2)$, respectively. Supplied with the sum signal $g_s$, a minimum deciding circuit 43 finds out a minimum of the three sums and supplies the work memory 41 with a new recurrence value signal $g_o$. The (i, j)-th recurrence value g(i, j) represented by the new recurrence value signal while the address signals are still indicative of the (i, j)-th integer pair, is stored in the work memory 41 at the address (i, j) as described in conjunction with FIG. 1. When the address signals are eventually indicative of the (I, J)-th integer pair (I, J), the work memory 41 produces an interpattern distance signal D representative of the interpattern distance D(U, V), which is in close approximation to the interpattern distance D(A, B) between the original patterns A and B.

Referring again to FIG. 5, the three sums calculated by the adder 42 (FIG. 6) correspond to additions of the intervector distances d(i, j)'s along first through third paths 46, 47, and 48, respectively. The addition along the third path 48 is objectionable because the intervector distance $d(i, j-1)$ for an instant pair (p(i), q(j-1)) or an integer pair (i, j-1) is neglected. In consideration of this, it is preferred to modify the recurrence formula (9) into a modified recurrence formula so that the third path 48 be changed to a fourth path 49 depicted by a polygonal dashed line. The modified recurrence formula is:

$$g(i, j) = \min \begin{bmatrix} d_w(i, j) + g(i - 1, j) \\ d_w(i, j) + g(i - 1, j - 1), \\ d_a(i, j) + g(i - 1, j - 2) \end{bmatrix} \quad (12)$$

where $d_a(i, j)$ will be called an (i, j)-th additional distance and is given by:

$$d_a(i, j) = [w(i, j)][c_1(i, j)][d(i, j)] + [w(i, j)][c_2(i, j)][d(i, j - 1)], \quad (13)$$

where, in turn, it is possible to understand that $[w(i, j)][c_1(i, j)]$ and $[w(i, j)][c_2(i, j)]$ are a first and a second additional weighting factor of an (i, j)-th set. In Equation (13), $c_1(i, j)$ and $c_2(i, j)$ will be named a first and a second factor (multiplier) of an (i, j)-th set and are defined by:

$$c_1(i, j) = t_j/(t_j + t_{j-1}) \qquad (14)$$
$$= [q(j) - q(j-1)]/[q(j) - q(j-2)],$$

Figure 8:
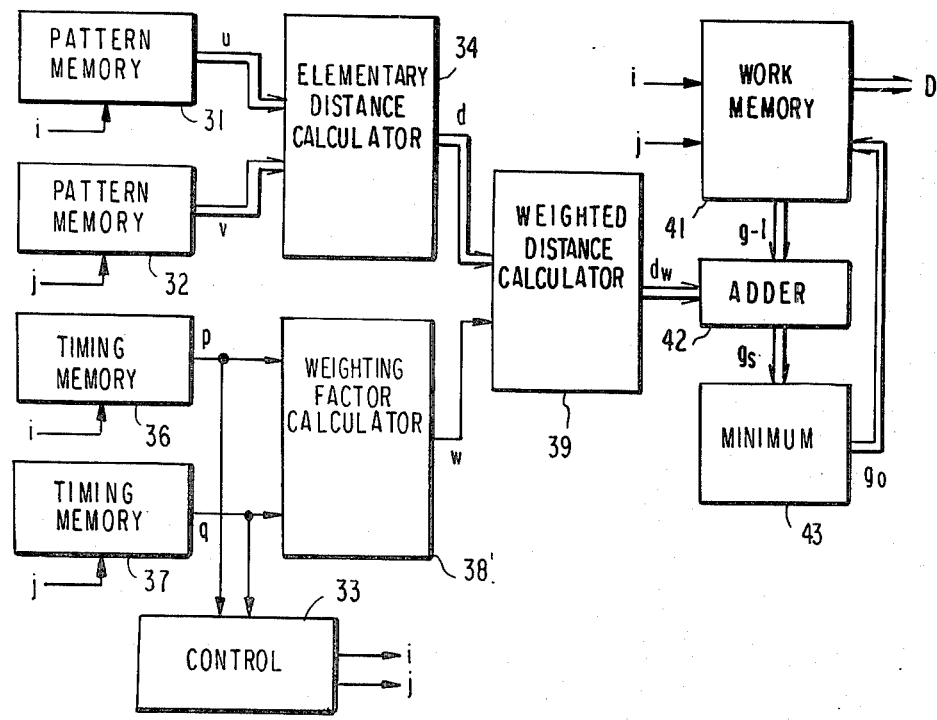
FIG. 8 is a block diagram of a pattern matching device according to a second embodiment of this invention.

Referring to FIG. 8, a pattern matching device according to a second embodiment of this invention comprises similar parts designated by like reference numerals. Supplied with the first and the second instant signals p and q, a modified weighting factor calculator 38' produces a factor signal, which is again designated by the reference letter w. When the first and the second address signals i and j are indicative of the (i, j)-th integer pair (I, J), the factor signal w successively represents the (i, j)-th weighting factor w(i, j) as already described in connection with FIG. 6 and subsequently the second and the first weighting factors of the (i, j)-th set as will presently be described more in detail. Responsive to the factor signal w and the distance measure signal d, the weighted distance calculator 39 produces a weighted distance signal which is again designated by $d_w$ and successively represents the (i, j)-th weighted distance $d_w(i, j)$ as before and the (i, j)-th additional distance $d_a(i, j)$ given by Equation (13) when the address signals are indicative of the (i, j)-th integer pair. Instead of the first and the second weighting factors of the (i, j)-th set, the factor signal w may represent the first and the second factors of the (i, j)-th set $c_1(i, j)$ and $c_2(i, j)$, respectively. As described with reference to FIG. 6, the illustrated device eventually provides the interpattern distance D(U, V).

Figure 9:
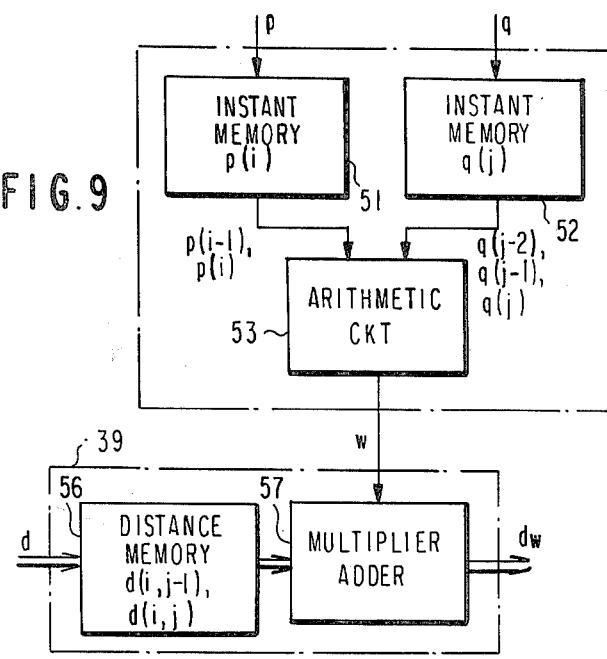
FIG. 9 is a block diagram of a weighting factor calculator and a weighted (and additional) similarity measure calculator for use in the device shown in FIG. 8.

Turning to FIG. 9, the weighting factor calculator 38' comprises first and second instant memories 51 and 52 for retaining the first and the second instant signals p and q, respectively. When the instant signals are indicative of the (i, j)-th instant pair (p(i), q(j)), the first instant memory 51 retains the (i−1)-th and the i-th input pattern extracting instants p(i−1) and p(i) and the second instant memory 52, the reference pattern extracting instants q(j−2), q(j−1), and q(j). An arithmetic circuit 53 calculates the (i, j)-th weighting factor w(i, j) at first by reading the instants p(i−1) and p(i) from the first instant memory 51. Subsequently, the instants q(j−2) through q(j) are read out of the second instant memory 52. The second and the first factors of the (i, j)-th set $c_2(i, j)$ and $c_1(i, j)$ are successively calculated according to Equations (15) and (14), respectively. Immediately following the respective instants of the successive calculation, the second and the first weighting factors of the (i, j)-th set are calculated.

In FIG. 9, the weighted distance calculator 39 comprises a distance memory 56 for retaining the intervector distances d(i, j−1) and d(i, j) when the distance measure signal d represents the i-th intervector distance d(i, j). A multiplier-adder 57 calculates the (i, j)-th weighted distance $d_w(i, j)$ at first by reading the (i, j)-th intervector distance d(i, j) and the (i, j)-th weighting factor w(i, j) from the distance memory 56 and the arithmetic circuit 53, respectively. Subsequently, the (i, j)-th additional distance $d_a(i, j)$ is calculated by reading the intervector distances d(i, j−1) and d(i, j) and the first and the second weighting factors of the (i, j)-th set from the distance memory 56 and the arithmetic circuit 53. As will readily be understood, it is possible to calculate the additional distance $d_a(i, j)$ at first and then the weighted distance $d_w(i, j)$. The order of calculation in the weighting factor calculator 38', such as calculation of the (i, j)-th weighting factor and either the first and the second additional weighting factors of the (i, j)-th set or the first and the second factors (multipliers) of the (i, j)-th set, is also optional.

It is worthwhile to note that the calculation of the additional weighting factors is troublesome to a certain extent. The weighting factor calculator 38' described with reference to FIG. 9 is accordingly somewhat complicated in structure. Equation (13) means that the (i, j)-th additional distance $d_a(i, j)$ is calculated by a linear combination of the (i, j)-th and the (i, j−1)-th intervector distances to which the (i, j)-th weighting factor is proportionally distributed in proportion to the j-th and the (j−1)-th intervector spacings $t_j$ and $t_{j-1}$, respectively. The proportion is equal to a ratio of the j-th intervector spacing $t_j$ to the (j−1)-th intervector spacing $t_{j-1}$. Such ratios are equal to finite numbers. In order to simplify the calculation, the ratios may be presumed to be always equal to unity. Under the presumption, an (i, j)-th modified additional distance, again denoted by $d_a(i, j)$, is given by:

$$d_a(i, j) = [w(i, j)][d(i, j)]/2 + [w(i, j)][d(i, j-1)]/2. \qquad (16)$$

Figure 10:
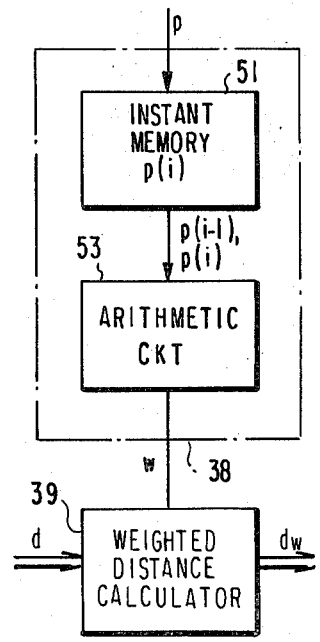
FIG. 10 is a block diagram of a weighting factor calculator and a weighted (and additional) similarity measure calculator for use in a pattern matching device according to a third embodiment of this invention.

Referring to FIG. 10, a weighting factor calculator 38 used in a pattern matching device according to a third embodiment of this invention, comprises only the first instant memory 51 and the arithmetic circuit 53 described in conjunction with FIG. 9. Although not depicted in detail, the illustrated arithmetic circuit may comprise a subtractor for calculating each weighting factor w(i, j) and a shift register for subsequently carrying out the division by two. The weighted distance calculator 39 is similar in structure to that described in conjunction with FIG. 9.

Reviewing the pattern matching devices thus far illustrated with reference to FIGS. 6 through 10, it is understood that the devices are for calculating an overall similarity measure D(U, V) between a first pattern U represented by a first vector sequence of first through I-th extracted vectors $u_1$ to $u_I$ positioned at those first through I-th instants p(1) to p(I), respectively, which are arranged with variable intervals of time as a first timing sequence, and a second pattern V represented by a second vector sequence of first through J-th extracted vectors $v_1$ to $v_J$ positioned at those first through J-th instants q(1) to q(J), respectively, which are arranged with variable spacings of time as a second timing sequence. The intervals may or may not be equal to durations between the consecutive "extracting" instants. The control unit 33 (in practice, in cooperation with the timing memories 36 and 37) serves as first circuitry for generating first and second timing signals i and j indicative of a pair of instants in the respective timing sequences at a time with the pair varied from a (1, 1)-th pair (p(1), q(1)) eventually to an (I, J)-th pair (p(I), q(J)) through an (i, j)-th pair (p(i), q(j)). Second circuitry comprising the pattern memories 31 and 32 and the calculators 34, 38 or 38', and 39, is responsive to the respective timing sequences for calculating an elementary similarity measure for the i-th and the j-th extracted vectors $u_i$ and $v_j$ when the timing sequences are indicative of the (i, j)-th pair. Third circuitry comprising the units 41 through 43, is responsive to the first and the second timing signals for iteratively calculating a recurrence formula, exemplified by the recurrence formulae (9) and (12), to successively give a plurality of recurrence values. When the timing signals are indicative of the (i, j)-th pair, the recurrence formula gives an (i, j)-th recurrence value g(i, j) by an extremum of a plurality of results of calculation which are calculated by the use of a prescribed number of previously calculated recurrence values and at least the (i, j)-th elementary similarity measure, respectively. The recurrence formula eventually gives the overall similarity measure by an (I, J)-th recurrence value g(I, J).

The device is characterised in that the second circuitry comprises fourth circuitry exemplified by the pattern memories 31 and 32, the elementary distance calculator 34, and the weighting factor calculator 38 or 38' and coupled to the first circuitry for calculating, when the timing signals are indicative of the (i, j)-th pair, an (i, j)-th intervector similarity measure d(i, j) between the i-th and the j-th extracted vectors $u_i$ and $v_j$ and an (i, j)-th weighting factor w(i, j) by the use of the interval of time [p(i)−p(i−1)]. The second circuitry furthermore comprises fifth circuitry comprising the weighted distance calculator 39 and coupled to the fourth circuitry for calculating, when the fourth circuitry calculates the (i, j)-th intervector similarity measure and the (i, j)-th weighting factor, the (i, j)-th elementary similarity measure.

In practice, the fifth circuitry is for calculating, when the fourth circuitry calculates the (i, j)-th intervector similarity measure, an (i, j)-th weighted similarity measure $d_w(i, j)$ as the (i, j)-th elementary similarity measure according to Equation (10).

In the device illustrated with reference to FIGS. 8 and 9, the first and the second timing signals i and j may be rendered indicative of the instants as described hereinabove as regards the usual circumstances and with three selected as the prescribed number. In this event, it is preferred that the second circuitry further comprises sixth circuitry comprising the second timing memory 37 and the weighting factor calculator 38' coupled to the first circuitry for calculating, when the timing signals are indicative of the (i, j)-th pair, first and second factors of an (i, j)-th set $c_1(i, j)$ and $c_2(i, j)$ by two differences which are defined by Equations (14) and (15), respectively. The fifth circuitry comprising the weighted distance calculator 39 is further coupled to the sixth circuitry for calculating, when the fourth circuitry calculates the (i, j)-th intervector similarity measure, not only the (i, j)-th weighted similarity measure $d_w(i, j)$ but additionally an (i, j)-th additional similarity measure $d_a(i, j)$ in compliance with Equation (13). The (i, j)-th weighted similarity measure is added by the third circuitry to the (i−1, j)-th and the (i−1, j−1)-th recurrence values to provide two of three sums. As another (i, j)-th elementary similarity measure, the (i, j)-th additional similarity measure is added to the (i−1, j−2)-th recurrence value to provide the remaining one of the three sums.

In the device illustrated in connection to FIG. 10, the address signals are again indicative of the instants under the usual circumstances. Also, three is used for the prescribed number. When the fourth circuitry calculates the (i, j)-th intervector similarity measure and consequently the (i, j)-th weighting factor, the fifth circuitry additionally calculates an (i, j)-th additional similarity measure according to Equation (16).

It is also understood that the memory capacity of the device is remarkably reduced not only as regards the work memory 41 as pointed out before but also the pattern memories 31 and 32 despite the necessity of the timing memories 36 and 37. Inasmuch as the input pattern duration I is astonishingly reduced, the device provides the interpattern distance D(U, V) in an accordingly short time. It has been confirmed through computer simulation tests that a speech recognition system comprising a pattern matching device according to this invention, is capable of well recognizing input speech patterns even with as small an information compression rate as the order of ⅓. The total memory capacity of each pattern memory 31 or 32 together with each timing memory 36 or 37, is reduced to about ⅓ of the memory capacity of each pattern memory 22 or 23 used in a conventional pattern matching device. The interpattern distance D(U, V) is calculated with the time shortened to about 1/9 as compared with the time which has been necessary with the conventional device. When the information compression rate is 1/c, the memory capacity and the time for the calculation are reduced to about 1/c and $1/c^2$, respectively.

It is, however, to be noted that the interpattern distance D(A, B) for the original patterns A and B is defined according to Equation (1) as a summation. Each recurrunce value g(i, j) is likewise defined by the recurrence formula (9) or (12) as a minimum of a plurality of sums, equal in number to the prescribed number. Both values are greater when the total number I of the extracted vectors of the input vector sequence Ev(U) is greater. This applies to the interpattern distance D(U, V) between the information compressed patterns U and V. In other words, the signals representative of these values have a considerably great number of bits. The work memory 41 must be capable of storing an accordingly great number of bits. The adder 42 and the minimum deciding circuit 43 must deal with that great number of bits.

It is possible to render a pattern matching device operable with signals of a smaller number of bits if the (i, j)-th weighted and additional distances $d_w(i, j)$ and $d_a(i, j)$ are modified into an (i, j)-th compensated and weighted distance $d_w'(i, j)$ and an (i, j)-th compensated additional distance $d_a'(i, j)$ in accordance with:

$$d_w'(i, j) = d_w(i, j) - \delta[w(i, j)], \quad (17)$$

and $$d_a'(i, j) = d_a(i, j) - \delta[w(i, j)], \quad (18)$$

where δ will be called a predetermined or compensation value and δ[w(i, j)], an (i, j)-th compensation factor (subtrahend). Equation (18) holds true only when the additional distance is given by Equation (16). If the additional distance defined by Equation (13) is preferred, the following equation should be used instead of Equation (18):

$$d_a'(i, j) = [w(i, j)][d(i, j)][c_1(i, j)] + \quad (19)$$
$$[w(i, j)][d(i, j-1)][c_2(i, j)] - \delta[w(i, j)],$$

in which the compensation factor is again used.

When multiplied by the predetermined value δ, the input pattern extracting instants will be referred to as compensated extracting instants. For the i-th input pattern extracting instant p(i), the compensated extracting instant δ[p(i)] will be called an i-th compensated extracting instant. A function of such compensated extracting instants substantially linearly monotonously increases with an increase in the integers i's of the first set by a constant rate which is equal to the predetermined value δ. When related to the function, namely, when expressed by the use of a deviation from the function, the (i, j)-th recurrence value g(i, j) is represented by:

$$g(i, j) = f(i, j) + \delta[p(i)], \quad (20)$$

where f(i, j), representative of the deviation, will be called an (i, j)-th relative recurrence value for the time being. The (i, j)-th recurrence value g(i, j) thus far used, is now given by the i-th compensated extracting instant δ[p(i)] and the (i, j)-th relative recurrence value f(i, j) relative to the i-th compensated extracting instant.

A signal representative of the relative recurrence values f(i, j)'s has only a small number of bits. Calculation defined by Equations (17) through (19) correspond to calculation of the recurrence formula (9) or (12) by the use of the relative recurrence values implicity defined by Equation (20). By substituting Equation (20) into, for example, the recurrence formula (12) and by rearranging the resulting formula:

$$f(i, j) = \min\begin{bmatrix} d_w'(i, j) + f(i - 1, j) \\ d_w'(i, j) + f(i - 1, j - 1), \\ d_a'(i, j) + f(i - 1, j - 2) \end{bmatrix} \quad (21)$$

which may temporarily be called a relative recurrence formula. The initial condition and an overall distance D'(U, V) are given by:

$$f(1, 1) = d(1, 1) - \delta,$$

and $$D'(U, V) = f(I, J). \quad (22)$$

It is possible to use such overall distances D'(U, V)'s calculated between an information compressed input pattern U and a plurality of information compressed reference patterns V's, respectively, as criteria for use in judging which of the original reference patterns B's is most similar to the original input pattern A. The overall distance is therefore capable of serving like an interpattern similarity measure. If desired, the interpattern distance is calculated by:

$$D(U, V) = D'(U, V) + \delta[p(i)].$$

In view of the foregoing, it is possible to refer to the relative recurrence formula and the (i, j)-th relative recurrence value merely as a recurrence formula (21) and an (i, j)-th recurrence value f(i, j). Conversely, the recurrence value g(i, j) defined by the recurrence formula (9) or (12) may be denoted by f(i, j). Each of the (i, j)-th compensated and weighted distance $d_w'(i, j)$ and the (i, j)-th compensated additional distance $d_a'(i, j)$ may be referred to merely as an (i, j)-th elementary similarity measure.

Figure 11:
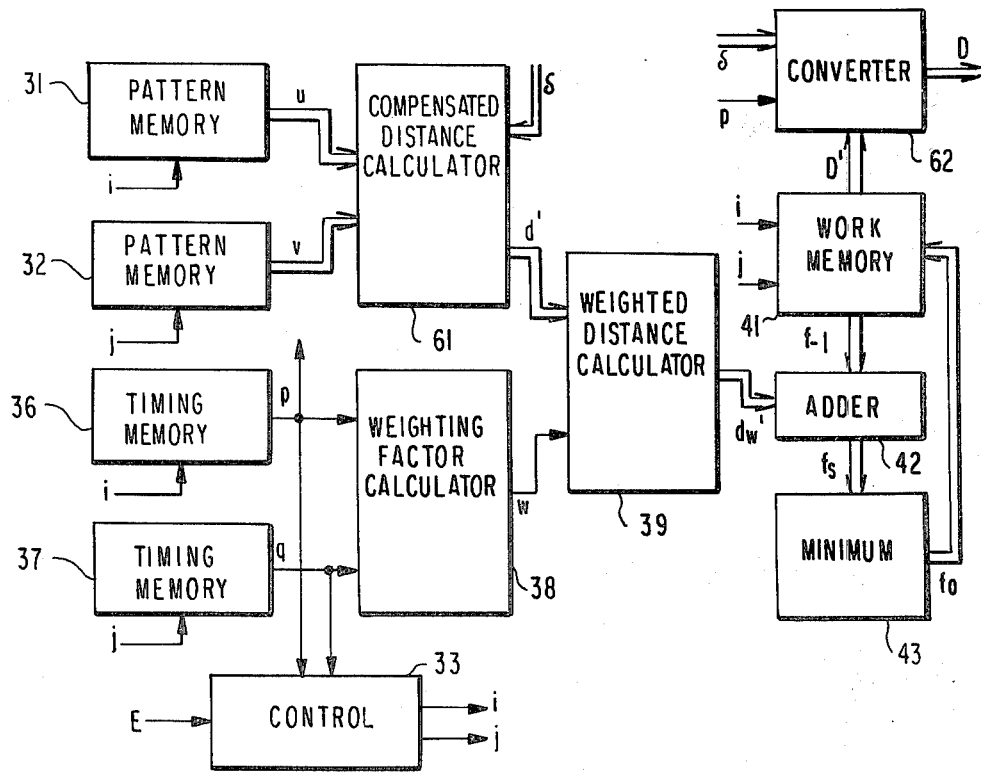
FIG. 11 is a block diagram of a pattern matching device according to a fourth embodiment of this invention.

Referring to FIG. 11, a pattern matching device according to a fourth embodiment of this invention comprises similar parts designated again by like reference numerals. A compensated distance calculator 61 is responsive to the distance measure signal d and a signal representative of the predetermined value δ for successively calculating compensated distances d'(i, j)'s to produce a compensated distance signal d' representative thereof. Supplied with the compensated distance signal d' and the weighting factor signal w, the weighted distance calculator 39 produces a compensated and weighted distance signal $d_w'$. When the distance signal d represents the (i, j)-th compensated distance d'(i, j), the compensated and weighted distance signal $d_w'$ represents the (i, j)-th compensated and weighted distance $d_w'(i, j)$ given by Equation (17) and, depending on the circumstances, also the (i, j)-th compensated additional distance $d_a'(i, j)$ according to Equation (18).

When the first and the second address signals i and j are indicative of the (i, j)-th integer pair (i, j), the work memory 41 is already loaded with previously calculated ones of the recurrence values f(i, j)'s and makes, under the usual circumstances described heretobefore, a previous recurrence value signal $f_{-1}$ represent the (i−1, j)-th, the (i−1, j−1)-th, and the (i−1, j−2)-th recurrence values f(i−1, j), f(i−1, j−1), and f(i−1, j−2). The adder 42 produces a sum signal $f_s$. The minimum deciding circuit 43 supplies the work memory 41 with a minimum representing signal $f_o$. The signals $f_s$ and $f_o$ are similar to the signals $g_s$ and $g_o$ described before. When the address signals are indicative of the (I, J)-th integer pair, the work memory 41 produces an eventual distance signal D' representative of the overall distance D'(U, V).

As described above, an end signal E representing arrival at the end point, namely, the I-th extracting instant p(I), of the input information compressed pattern U, is supplied to the control unit 33. The first instant signal p representative of the I-th extracting instant is supplied to a converter 62 together with the signal representative of the predetermined value δ and the overall distance signal D'. The converter 62, which is now a multiplier-adder, produces an interpattern distance signal D representative of the interpattern distance D(U, V) calculated in compliance with Equation (22).

Figure 12:
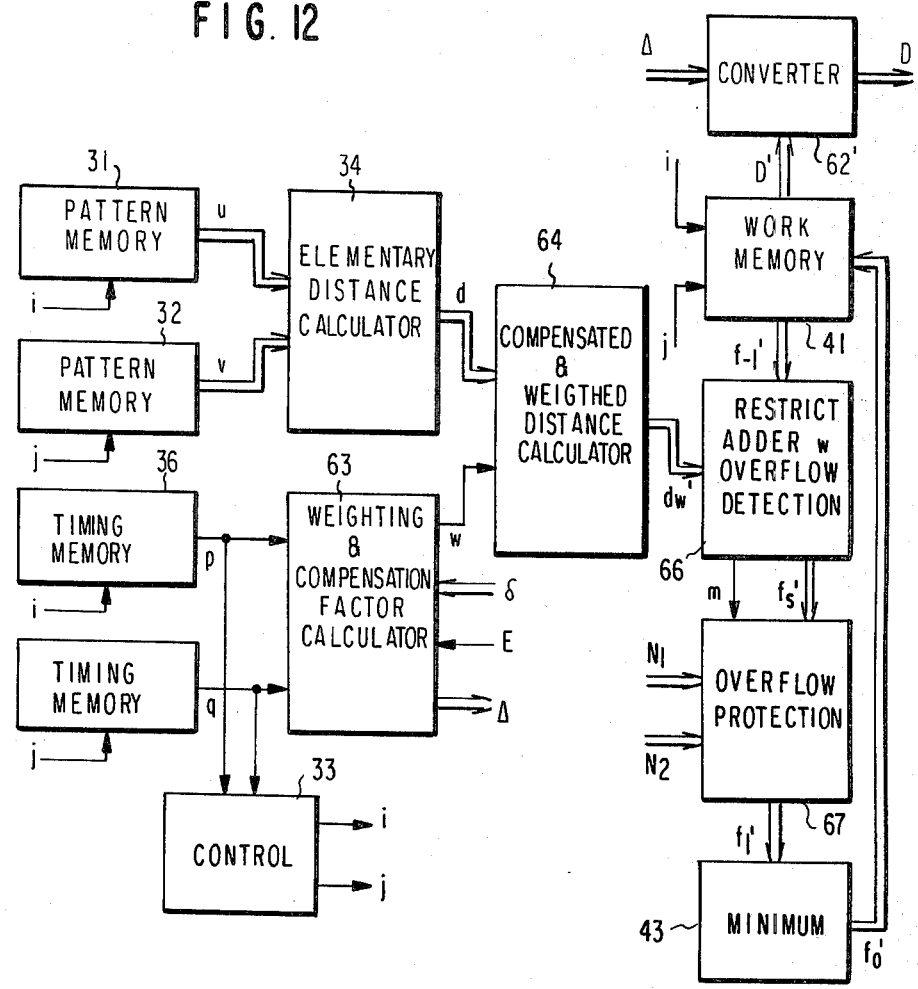
FIG. 12 is a block diagram of a pattern matching device according to a fifth embodiment of this invention.

Referring to FIG. 12, a pattern matching device according to a fifth embodiment of this invention is similar in structure to that illustrated with reference to FIG. 11. It is assumed that the compensated additional distances should be calculated according to Equation (19). The elementary distance calculator 34 is substituted for the compensated distance calculator 61. Responsive to the first and the second instant signals p and q and the signal representative of the predetermined value δ, a weighting and compensation factor calculator 63 calculates, when the instant signals are representative of the (i, j)-th instant pair (p(i), q(j)), an (i, j)-th group of factors comprising the (i, j)-th weighting factor w(i, j), the first and the second weighting factors of the (i, j)-th set, and the (i, j)-th compensation factor δ[w(i, j)]. An output signal of the calculator 63 successively represents the factors of the (i, j)-th group and will again be referred to as a weighting factor signal w.

Supplied with the distance measure signal d and such a weighting factor signal w, a compensated and weighted distance calculator 64 subtracts, when the elementary distance calculator 34 calculates the (i, j)-th intervector distance d(i, j), the (i, j)-th compensation factor from the weighted and the additional (i, j)-th distances $d_w(i, j)$ and $d_a(i, j)$ to provide the (i, j)-th compensated and weighted distance $d_w'(i, j)$ of Equation (17) as the (i, j)-th elementary similarity measure and the (i, j)-th compensated additional distance $d_a'(i, j)$ of Equation (19).

Turning temporarily back to FIG. 9, the weighting and compensation factor calculator 63 is composed by supplying the signal representative of the predetermined value δ to the arithmetic circuit 53. The compensated and weighted distance calculator 64 is implemented by making the adder of the multiplier-adder 57 carry out the above-described subtraction.

FIG. 12, the work memory 41 produces, as will shortly become clear, a previous recurrence value signal $f_{-1}'$ having a still less number of bits than the previous recurrence value signal $f_{-1}$ described in conjunction with FIG. 11. A modified adder 66 is substituted for the adder 42 thus far described. The adder 66 is for calculating the sums in compliance with the recurrence formula (21) or the like. Only when the calculated sum is not greater than a first preselected value $N_1$ and is not less than a second preselected value $N_2$, the adder 66 produces a restricted sum signal $f_s'$ successively representative of such restricted sums. Naturally, the first preselected value $N_1$ is greater than the second preselected value $N_2$. For example, the first and the second preselected values may be equal to twice the predetermined value 2δ and zero, respectively.

When the calculated sum is greater than the first preselected value $N_1$, positive overflow takes place. When the calculated sum is less than the second preselected value $N_2$, negative overflow occurs. In addition to the restricted sum signal $f_s'$, the adder 66 produces an overflow signal m which takes first, second, and third signal values when the positive overflow, the negative overflow, and no overflow, occur, respectively.

Controlled by the overflow signal m and supplied with the restricted sum signal $f_s'$ and signals representative of the first and the second preselected values $N_1$ and $N_2$, an overflow protection circuit 67 carries out a saturation processing operation to produce a saturation processed signal $f_1'$ representative of the restricted sum and the first and the second preselected values when the overflow signal m takes the third, the first, and the second values, respectively. The values thus represented by the saturation processed signal $f_1'$, will be called saturation processed sums. When the address signals i and j supplied to the work memory 41 and indicative of the (i, j)-th integer pair, the minimum deciding circuit 43 finds a minimum of the saturation processed sums to provide an (i, j)-th saturation processed recurrence value f'(i, j). A new recurrence value signal $F_0'$ supplied from the minimum deciding circuit 43 back to the work memory 41 represents such saturation processed recurrence values f'(i, j)'s.

An (I, J)-th saturation processed recurrence value f'(I, J) eventually calculated in this manner may be different from the above-described (I, J)-th recurrence value f(I, J) depending on the overflow. The saturation processing operation, however, suppresses the difference to a minimum. In any event, it is preferred that the end signal E be supplied to the weighting and compensation factor calculator 63 rather than to the control unit 33. The calculator 63 produces an I-th compensated instant signal Δ representative of the I-th compensated instant δ[p(i)]. The converter 62 described in connection with FIG. 11 may now be a subtractor and is designated at 62'.

Reviewing the pattern matching devices illustrated with reference to FIGS. 11 and 12 in consideration of the devices reviewed hereinabove, it is understood that the second circuitry further comprises subtracting circuitry indicated by the signal line for the signal representative of the predetermined value δ. The subtracting circuitry is coupled to the fourth circuitry for calculating, when the fourth circuitry calculates the (i, j)-th intervector similarity measure, an (i, j)-th compensated similarity measure d'(i, j) by subtracting the predetermined value δ from the (i, j)-th intervector similarity measure d(i, j). The fifth circuitry is coupled additionally to the subtracting circuitry for calculating, when the subtracting circuitry calculates the (i, j)-th compensated similarity measure, an (i, j)-th compensated and weighted similarity measure $d_w'(i, j)$ as the (i, j)-th elementary similarity measure in compliance with Equation (17). Alternatively, the weighting factor calculator 38' described with reference to FIGS. 8 and 9 should be supplied with the signal for the predetermined value δ and calculates not only each group of the weighting factor and the first and the second factors but also the compensation factor. The alternative is equivalent to the second circuitry comprising the fourth and the subtracting circuitry. In either event, the overall similarity measure given by the (I, J)-th recurrence value f(I, J) or f'(I, J) is related to the interpattern similarity measure D(U, V).

The third circuitry of such a device may additionally comprise circuitry, such as a line labelled in FIG. 12 with the reference letter m, responsive to, on calculating the (i, j)-th recurrence value f'(i, j) or f(i, j), a plurality of sums of an (i, j)-th group which are equal to the previously calculated recurrence values plus at least the (i, j)-th compensated and weighted distance $d_w'(i, j)$, respectively, for producing an overflow signal m which takes first, second, and third signal values when each of the sums of the (i, j)-th group is greater than a first preselected value, is less than a second preselected value, and is an (i, j)-th restricted sum which, in turn, is neither greater than the first preselected value nor less than the second preselected value, respectively. If equipped with such circuitry, the third circuitry should further comprise circuitry, such as the overflow protection circuit 67, responsive to the overflow signal for providing each of the above-mentioned result of addition by the first and the second preselected values and the (i, j)-th restricted sum when the overflow signal takes the first through the third signal values, respectively.

If desired, the overall similarity measure D'(U, V) is converted to the interpattern similarity measure D(U, V). For a device in which the first circuitry generates the first and the second timing signals i and j with the first timing signal rendered ascendingly consecutively indicative of the first through the I-th instants p(1) to p(I) and with the second timing signal successively rendered indicative of a plurality of ascendingly consecutive instants of the second timing sequence within each interval of time during which the first timing signal indicates one instant of the first timing sequence, the conversion is carried out by circuitry, such as the control unit 33 supplied with the end signal E, responsive to the first timing signal for totalizing the intervals of time to provide a total duration of the first pattern U. Such a device should further comprise circuitry, such as the converter 62, for calculating a product of the total duration and the predetermined value δ and for adding the product to the overall similarity measure to provide the interpattern similarity measure.

When the instants indicated by the first and the second timing signals are varied as described under the usual circumstances and furthermore when three is selected as the prescribed number, it is preferred that the fifth circuitry coupled to the subtracting circuitry as already described, should additionally calculate, when the subtracting circuitry calculates the (i, j)-th compensated similarity measure, an (i, j)-th compensated additional similarity measure $d_a'(i, j)$ according to Equation (18). Alternatively, it is equally preferred that the second circuitry should further comprise the sixth circuitry of the type described before and seventh circuitry, as implied in FIG. 12 by a signal line for the signal representative of the predetermined value $\delta$, coupled to the fourth circuitry for calculating, when the fourth circuitry calculates the (i, j)-th weighting factor, an (i, j)-th compensation factor by multiplying the (i, j)-th weighting factor $w(i, j)$ by the predetermined value $\delta$. The fifth circuitry is coupled to the sixth circuitry for calculating, when the fourth circuitry calculates the (i, j)-th intervector similarity measure, an (i, j)-th weighted similarity measure $d_w(i, j)$ and an (i, J)-th additional similarity measure $d_a(i, j)$ according to Equations (10) and (13). The fifth circuitry is further coupled to the seventh circuitry for calculating, when the fourth circuitry calculates the (i, j)-th intervector similarity measure, an (i, j)-th compensated and weighted similarity measure $d_w'(i, j)$ as the (i, j)-th elementary similarity measure according to Equation (17) and an (i, j)-th compensated additional similarity measure $d_a'(i, j)$, by the use of Equation (19).

Figure 13:
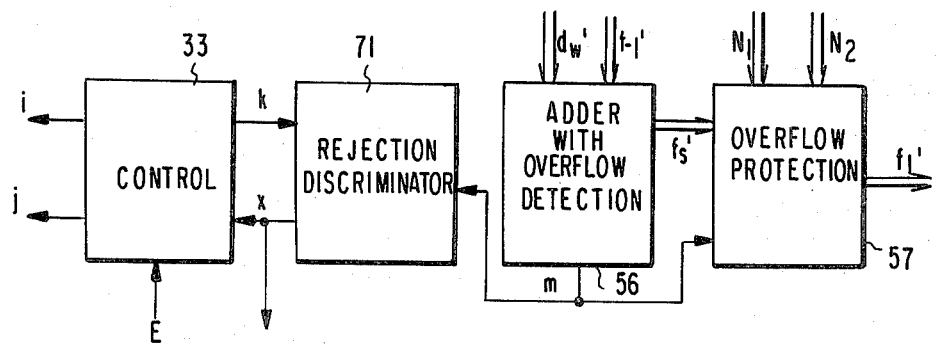
FIG. 13 partly shown, in blocks, a pattern matching device according to a sixth embodiment of this invention.

Referring to FIG. 13, a pattern matching device according to a sixth embodiment of this invention is for use in a pattern recognition system and is capable of implementing the pattern rejection technique described heretobefore. In addition to the circuit units illustrated with reference to FIG. 11 or 12, the illustrated device comprises a rejection discriminator 71. Besides the first and the second address signals i and j indicative of the instant pairs as described for the usual circumstances, the control unit 33 produces a discrimination initiating signal k at the beginning of each interval of time during which the first address signal indicates one of the first through the I-th integers i's of the first set.

The pattern rejection technique will now be described in greater detail. The recurrence values $f(i, j)$ shows a generally monotonous increase with an increase in the integers i's of the first set. The recurrence values successively calculated for a reference pattern V within an interval of time during which the first address signal indicates the i-th integer i, namely, the recurrence values $[f(i, j)\text{'s}]_{i=i}$, will now be denoted by $f_i(j)$. If the positive overflow continues, namely, the overflow signal m always takes the first signal value, throughout the interval under consideration, the recurrence values $f_i(j)$ and the subsequently calculated recurrence values $f_{i+1}(j)$ through $f_I(j)$ are greater than the first preselected value $N_1$. The overall distance $f(I, J)$ would have an appreciably great value. The pattern matching operation for such a reference pattern V is meaningless and should be rejected or discontinued. Only when the overflow signal m does not always take the first signal value during the interval in question, calculation of the subsequent recurrence values $f_{i+1}(j)$ and so forth should be carried on. In other words, the pattern matching operation should be kept in progress.

Responsive to the discrimination initiating signal k, the rejection discriminator 71 monitors the overflow signal m and produces a signal pulse x if the overflow signal always takes the first signal value throughout an interval during which the first address signal i indicates a certain one of the instants of the first timing sequence. The signal pulse x is supplied back to the control unit 33 to stop generation of the first and the second address signals and thereby to discontinue the pattern matching operation. Responsive to the signal pulse, the control unit 33 may change the above-mentioned pattern specifying signal to specify another of the reference patterns V's. The signal pulse may furthermore be delivered to other part of parts of the pattern recognition system.

Figure 14:
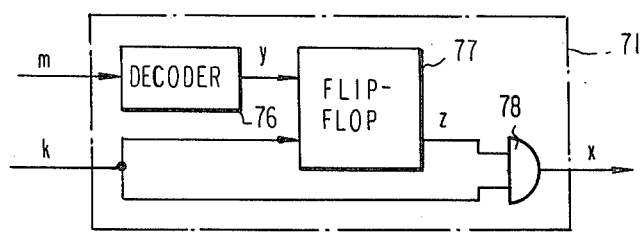
FIG. 14 is a block diagram of a rejection discriminator for use in the device illustrated in FIG. 13.
Figure 15A:
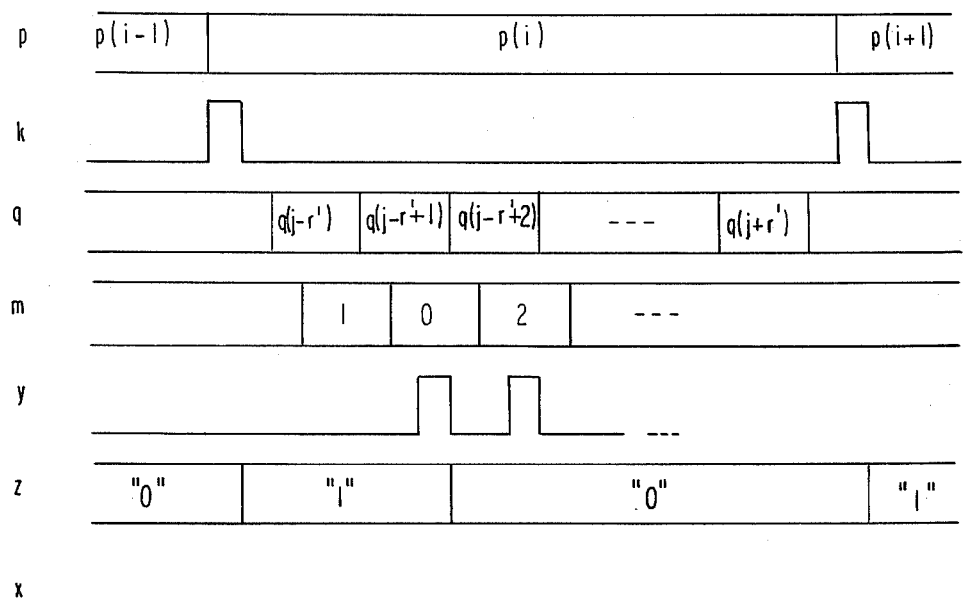
FIGS. 15(A) and (B) are time charts for use in describing operation of the rejection discriminator shown in FIG. 14.
Figure 15B:
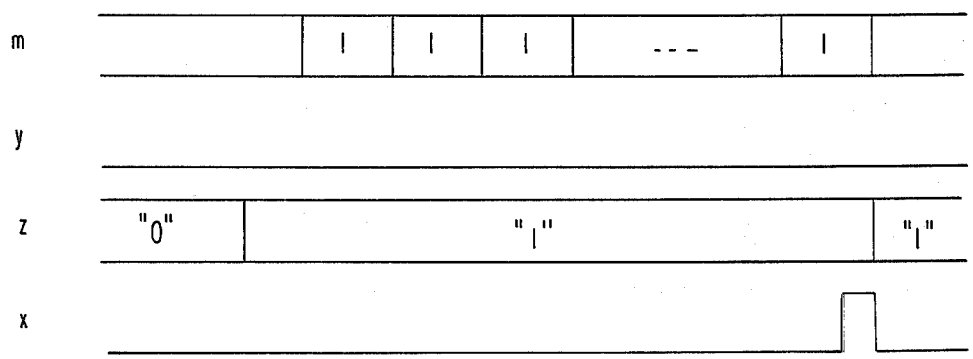

Turning to FIGS. 14 and 15 (A), the discrimination initiating signal k may be a sequence of timed pulses building up to a logic one level from a logic zero level and down to the logic zero level at the leading end portions of the respective intervals of time. During the interval in which the first address signal i makes the first instant signal p designate the i-th input pattern extracting instant p(i), the second address signal j makes the second instant signal q designate a plurality of reference pattern extracting instants q(j)'s conditioned by Equation (11). Such instants q(j)'s are denoted by $q(i-r')$, $q(i-r'+1)$, ..., and $q(i+r')$, where $r'$ represents a positive integer decided by the window length r and the i-th integer i. Instant pairs (p(i), q(i−r′)) and so on, are exemplified in FIG. 7 by the encircled dots.

A case is shown in FIG. 15 (A), in which the overflow signal m does not always take the first signal value throughout the intervals for the i-th instant p(i). The first through the third signal values are exemplified by 1, 2, and 0, respectively. The rejection discriminator 71 (FIG. 14) comprises a decoder 76 for decoding the overflow signal m to produce a pulse signal y only when the overflow signal takes either of the second and the third signal values. A flip-flop 77 is set by each timed pulse k supplied to the set input terminal thereof to produce a set output signal z switched to the logic one level from the logic zero level at the trailing edge of the timed pulse k. The pulse signal y, when produced, is supplied to the reset input terminal of the flip-flop 77 to switch the set output signal z from the logic one level back to the logic zero level at the trailing edge of the pulse signal. The set output signal z of the logic one level is for enabling an AND gate 78 to allow passege therethrough of the timed pulse k as the signal pulse x. Inasmuch as the set output signal z is turned back to the logic zero level and kept there before later switched to the logic one level at the beginning of the next following interval in which the first address signal i indicates the (i+1)-th instant p(i+1), no signal pulse x appears. The pattern matching operation is kept in progress.

Finally referring to FIG. 15 (B), another case is shown in which the positive overflow continues throughout the interval for the i-th constant p(i). In other words, the overflow signal m always takes the first signal value (m=1) throughout the interval under consideration. It is assumed that the positive overflow, if any, did not continue throughout the intervals for the first through the (i−1)-th instants p(1) to p(i−1). No pulse signal y is produced throughout the interval for the i-th instant p(i). The set output signal z is kept at the logic one level. The timed pulse k produced at the beginning of the interval for the (i+1)-th instant p(i+1), passes through the AND gate 78 (FIG. 14) as a signal pulse x.

While this invention has so far been described in conjunction with several preferred embodiments thereof, it will now be readily feasible for one skilled in the art to carry this invention into effect in various other ways.

In particular, the principles of this invention may be combined with various known techniques.

When the correlation measure is used as the similarity measure with the maximum used as the extremum on calculating the recurrence formula (9), (12), (21), or the like, the pattern matching operation should be rejected if the negative overflow, rather than the positive one, continues throughout an interval of time for a certain instant of the first time sequence under the circumstances of the type described above. Modifications are possible also to the hardware implementation. For example, the work memory 41 may produce the previous recurrence value signal $g_{-1}$, $f_{-1}$, or $f_{-1}'$ as a plurality of parallel signals, such as the signals $g_1$ through $g_3$ described in connection with FIG. 1. As regards the work memory 41, it is necessary on calculating the recurrence formula during an interval for the i-th instant p(i) under the above-mentioned usual circumstances, to use only the recurrence values $f_{i-1}(j)$ calculated during a next previous interval for the (i−1)-th instant p(i−1). It is therefore possible to discard the older recurrence values $f_1(j)$ through $f_{i-2}(j)$ and thereby to further reduce the memory capacity. The rejection discriminator 71 may be implemented by various other circuit elements. Furthermore, the signal levels exemplified with reference to FIGS. 15 (A) and (B) are optional insofar as the rejection operation is properly carried out. The number of previously calculated recurrence values used in the recurrence formula depends on the selected form or scheme. It is furthermore possible to modify Equation (1) by the use of the mapping function of any other form, such as $\phi(i, j)=0$, where $\phi$ is a function notation. Incidentally, it is possible to make a microcomputer or the like produce the signals representative of the predetermined value $\delta$ and others.

Finally, it should clearly be understood that the timing memories 36 and 37 may be loaded with the timing sequences of the intervals and spacings defined by Equations (7) and (8). If the pattern matching device is of the type illustrated with reference to FIG. 6, 10, or 11, it is possible to omit the weighting factor calculator 38 with the weighted distance calculator 39 rendered, on using also the additional similarity measures of Equation (16) or (18), capable of dividing the respective weighting factors by two. Such a device is equivalent to the device in which the timing sequences of Equations (4) and (6) are used. It is, however, necessary on controlling the address signals i and j that the control unit 33 should sum up the intervals $s_i$'s and the spacings $t_j$'s so as to provide the i-th and the j-th instants p(i)'s and q(j)'s. The device comprising the weighting factor calculator 38 as illustrated with reference to FIG. 6, 10, or 11, is equivalent to a device instead comprising the weighting and compensation factor calculator 63.

What is claimed is:

1. In a pattern matching device for calculating an overall similarity measure between a first pattern U represented by a first vector sequence of first through I-th extracted vectors positioned at first through I-th instants, respectively, which are arranged with variable intervals of time as a first timing sequence, and a second pattern V represented by a second vector sequence of first through J-th extracted vectors positioned at first through J-th instants, respectively, which are arranged with variable spacings of time as a second timing sequence, said device comprising first means for generating first and second timing signals indicative of a pair of instants in said first and said second timing sequences at one time, respectively, with the pair varied from a (1, 1)-th pair of the first instants of the respective timing sequences eventually to an (I, J)-th pair of said I-th and said J-th instants through an (i, j)-th pair of the i-th and the j-th instants where i and j are representative of two integers between 1 and I and between 1 and J, respectively, second means responsive to said first and said second timing signals for calculating an (i, j)-th elementary similarity measure for the i-th and the j-th extracted vectors when said first and said second timing signals are indicative of the (i, j)-th pair, and third means responsive to said first and said second timing signals and to the (i, j)-th elementary similarity measures for iteratively calculating a recurrence formula to successively give a plurality of recurrence values, said recurrence formula given, when said first and said second timing signals are indicative of the (i, j)-th pair, an (i, j)-th one f(i, j) of said recurrence values by an extremum of a plurality of results of calculation which are calculated by the use of a prescribed number of previously calculated recurrence values and at least the (i, j)-th elementary similarity measure, respectively, said recurrence formula eventually giving said overall similarity measure by an (I, J)-th one f(I, J) of said recurrence values, the improvement wherein said second means comprises:

fourth means coupled to said first means for calculating, when said first and said second timing signals are indicative of the (i, j)-th pair, an (i, j)-th intervector similarity measure d(i, j) between the i-th and the j-th extracted vectors and an (i, j)-th weighting factor w(i, j) by the use of the interval of time from the (i−1)-th instant to the i-th instant; and fifth means coupled to said fourth means for calculating, when said fourth means calculates the (i, j)-th intervector similarity measure and the (i, j)-th weighting factor, the (i, j)-th elementary similarity measure.

2. A pattern matching device as claimed in claim 1, wherein said fifth means calculates, when said fourth means calculates the (i, j)-th intervector similarity measure, an (i, j)-th weighted similarity measure $d_w(i, j)$ as the (i, j)-th elementary similarity measure by multiplying the (i, j)-th intervector similarity measure d(i, j) by the (i, j)-th weighting factor w(i, j), said overall similarity measure being equal to an interpattern similarity measure D(U, V) between said first and said second patterns U and V.

3. A pattern matching device as claimed in claim 2, said first means generating said first and said second timing signals with said first timing signal rendered ascendingly consecutively indicative of said first through said I-th instants and with said second timing signal rendered successively indicative of a plurality of ascendingly consecutive instants of said second timing sequence within each of the intervals of time during which said first timing signal indicates one of the instants of said first timing sequence, said prescribed number being three, said previously calculated recurrence values being the (i−1, j)-th, the (i−1, j−1)-th, and the (i−1, j−2)-th recurrence values f(i−1, j), f(i−1, j−1), and f(i−1, j−2) when said first and said second timing signals are indicative of the (i, j)-th pair, wherein said third means calculates said recurrence formula with the results of calculation given, when said first and said second timing signals are indicative of the (i, j)-th pair, by three sums which are equal to the i−1, j)-th, the (i−1, j−1)-th, and the (i−1, j−2)-th recurrence values f(i−1, j), f(i−1, j−1), and f(i−1, j−2) plus the (i, j)-th weighted similarity measure $d_w(i, j)$, respectively.

4. A pattern matching device as claimed in claim 2, said first means generating said first and said second timing signals with said first timing signal rendered ascendingly consecutively indicative of said first through said I-th instants and with said second timing signal rendered successively indicative of a plurality of ascendingly consecutive instants of said second timing sequence within each of the intervals of time during which said first timing signal indicates one of the instants of said first timing sequence, said prescribed number being three, said previously calculated recurrence values being the (i−1, j)-th, the (i−1, j−1)-th, and the (i−1, j−2)-th recurrence values f(i−1, j), f(i−1, j−1), and f(i−1, j−2) when said first and said second timing signals are indicative of the (i, j)-th pair, wherein:

said second means further comprises sixth means coupled to said first means for calculating, when said first and said second timing signals are indicative of the (i, j)-th pair, j-th and (j−1)-th intervector spacings in said second timing sequence $t_j$ and $t_{j−1}$ by two differences which are equal to the j-th instant minus the (j−1)-th instant and to the (j−1)-th instant minus the (j−2)-th instant, respectively;

said fifth means being further coupled to said sixth means for additionally calculating, when said fourth means calculates the (i, j)-th intervector similarity measure, an (i, j)-th additional similarity measure $d_a(i, j)$ by a linear combination of the (i, j)-th and the (i, j−1)-th intervector similarity measures d(i, j) and d(i, j−1) to which the (i, j)-th weighting factor w(i, J) is proportionally distributed in proportion to the j-th and the (j−1)-th intervector spacings $t_j$ and $t_{j−1}$, respectively;

said third means calculating said recurrence formula with the results of calculation given, when said first and said second timing signals are indicative of the (i, j)-th pair, by two sums which are equal to the (i−1, j)-th and the (i−1, j−1)-th recurrence values f(i−1, j) and f(i−1, j−1) plus the (i, j)-th weighted similarity measure $d_w(i, j)$, respectively, and a sum which is equal to the (i−1, j−2)-th recurrence value f(i−1, j−2) plus the (i, j)-th additional similarity measure $d_a(i, j)$.

5. A pattern matching device as claimed in claim 2, said first means generating said first and said second timing signals with said first timing signal rendered ascendingly consecutively indicative of said first through said I-th instants and with said second timing signal rendered successively indicative of a plurality of ascendingly consecutive instants of said second timing siquence within each of the intervals of time during which said first timing signal indicates one of the intervals of said first timing sequence, said prescribed number being three, said previously calculated recurrence values being the (i−1, j)-th, the (i−1, j−1)-th, and the (i−1, j−2)-th recurrence values f(i−1, j), f(i−1, j−1), and f(i−1, j−2) when said first and said second timing signals are indicative of the (i, j)-th pair, wherein:

said fifth means is for additionally calculating, when said fourth means calculates the (i, j)-th intervector similarity measure, an (i, j)-th additional similarity measure $d_a(i, j)$ by a linear combination of the (i, j)-th and the (i, j−1)-th intervector similarity measures d(i, j) and d(i, j−1), each of which is multiplied by a half of the (i, j)-th weighting factor w(i, j);

said third means calculating said recurrence formula with the results of calculation given, when said first and said second timing signals are indicative of the (i, j)-th pair, by two sums which are equal to the (i−1, j)-th and the (i−1, j−1)-th recurrence values f(i−1, J) and f(i−1, J−1) plus the (i, j)-th weighted similarity measure $d_w(i, j)$, respectively, and a sum which is equal to the (i−1, j−2)-th recurrence value f(i−1, J−2) plus the (i, j)-th additional similarity measure $d_a(i, j)$.

6. A pattern matching device as claimed in claim 1, wherein:

said second means further comprises subtracting means coupled to said fourth means for calculating, when said fourth means calculates the (i, j)-th intervector similarity measure, an (i, j)-th compensated similarity measure d'(i, j) by subtracting a predetermined value δ from the (i, j)-th intervector similarity measure d(i, j);

said fifth means being further coupled to said subtracting means for calculating, when said subtracting means calculates the (i, j)-th compensated similarity measure, an (i, j)-th compensated and weighted similarity measure $d_w'(i, j)$ as the (i, j)-th elementary similarity measure by multiplying the (i, j)-th compensated similarity measure d'(i, j) by the (i, j)-th weighting factor w(i, j);

said overall similarity measure being related to an interpattern similarity measure D(U, V) representative of whether said first and said second patterns U and V are similar or dissimilar to each other.

7. A pattern matching device as claimed in claim 6, wherein said third means comprises:

means responsive to said first and said second timing signals and to the (i, j)-th elementary similarity measures for calculating, when said first and said second timing signals are indicative of the (i, j)-th pair and consequently when said recurrence formula gives the (i, j)-th recurrence value f(i, j), a plurality of sums of an (i, j)-th group which are equal to the previously calculated recurrence values of said prescribed number plus at least the (i, j)-th compensated and weighted similarity measure $d_w'(i, j)$, respectively;

means responsive to the sums of the (i, j)-th group for producing an overflow signal which takes first, second, and third signal values when each of the sums of the (i, j)-th group is greater than a first preselected value, is less than a second preselected value, and is an (i, j)-th restricted sum which, in turn, is neither greater than said first preselected value nor less than said second preselected value, respectively; and means responsive to said overflow signal for providing each of the results of calculation for the (i, j)-th recurrence value f(i, j) by said first and said second preselected values and the (i, j)-th restricted sum when said overflow signal takes said first through said third signal values, respectively.

8. A pattern matching device as claimed in claim 7, said first means generating said first and said second timing signals with said first timing signal rendered ascendingly consecutively indicative of said first through said I-th instants and with said second timing signal rendered successively indicative of a plurality of ascendingly consecutive instants of said second timing sequence within each of the intervals of time during which said first timing signal indicates one of the instants of said first timing sequence, further comprising additional means responsive to said overflow signal for keeping generation by said first means of said first and said second timing signals in progress and for discontinuing said generation if said overflow signal always takes and does not always take a predetermined one of said first and said second signal values throughout at least one of the intervals of time, respectively, said predetermined one signal value being said first and said second signal values when said extremum is a minimum and a maximum, respectively.

9. A pattern matching device as claimed in claim 8, wherein said additional means comprises:
means for generating a sequence of timed pulses at the beginnings of said intervals of time, respectively;
means responsive to said overflow signal for producing a pulse signal only when said overflow signal does not always take said predetermined one signal value throughout each of said intervals of time;
output switching means responsive to each of said timed pulses for switching an output signal thereof from a first level to a second level, said output switching means being further responsive to said pulse signal for switching said output signal from said second level back to said first level; and
signal pulse producing means responsive to the output signal of said first level for producing one of said timed pulses as a signal pulse for discontinuing said generation, said signal pulse producing means being further responsive to the output signal of said second level for producing noe of said timed pulses to keep said generation in progress.

10. A pattern matching device as claimed in claims 8 or 9, said prescribed number being three, said previously calculated recurrence values being the $(i-1, j)$-th, the $(i-1, J-1)$-th, and the $(i-1, J-2)$-th recurrence values when said first and said second timing signals are indicative of the $(i, j)$-th pair, wherein said sum calculating means calculates the sums of the $(i, j)$-th group by adding the $(i, j)$-th compensated and weighted similarity measure $d_w'(i, j)$ to the $(i-1, J)$-th, the $(i-1, j-1)$-th, and the $(i-1, J-2)$-th recurrence values $f(i-1, j)$, $f(i-1, j-1)$, and $f(i-1, j-2)$, respectively.

11. A pattern matching device as claimed in claims 8 or 9, said prescribed number being three, said previously calculated recurrence values being the $(i-1, j)$-th, the $(i-1, j-1)$-th, and the $(i-1, j-2)$-th recurrence values when said first and said second timing signals are indicative of the $(i, j)$-th pair, wherein:
said second means further comprises sixth means coupled to said first means for calculating, when said first and said second second timing signals are indicative of the $(i, j)$-th pair, j-th and $(j-1)$-th intervector spacings in said second timing sequence $t_j$ and $t_{j-1}$ by subtracting the $(j-1)$-th and the $(j-2)$-th instants for the j-th and the $(j-1)$-th instants, respectively;
said fifth means being further coupled to said sixth means for additionally calculating, when said subtracting means calculates the $(i, j)$-th compensated similarity measure, an $(i, j)$-th compensated additional similarity measure $d_a'(i, j)$ by a linear combination of the $(i, j)$-th and the $(j-1)$-th compensated similarity measures $d'(i, j)$ and $d'(i, j-1)$ to which the $(i, j)$-th weighting factor $w(i, j)$ is proportionally distributed in proportion to the j-th and the $(j-1)$-th intervector spacings $t_j$ and $t_{j-1}$, respectively;
said sum calculating means calculating the sums of the $(i, j)$-th group by two sums which are equal to the $(i-1, j)$-th and the $(i-1, j-1)$-th recurrence values $f(i-1, j)$ and $f(i-1, j-1)$ plus the $(i, j)$-th compensated and weighted similarity measure $d_w'(i, j)$, respectively, and a sum which is equal to the $(i-1, j-2)$-th recurrence value $f(i-1, j-2)$ plus the $(i, j)$-th compensated additional similarity measure $d_a'(i, j)$.

12. A pattern matching device as claimed in claims 8 or 9, said prescribed number being three, said previously calculated recurrence values being the $(i-1, j)$-th, the $(i-1, j-1)$-th, and the $(i-1, j-2)$-th recurrence values when said first and said second timing signals are indicative of the $(i, j)$-th pair, wherein:
said fifth means additionally calculates, when said subtracting means calculates the $(i, j)$-th compensated similarity measure, an $(i, j)$-th compensated additional similarity measure $d_a'(i, j)$ by a linear combination of the $(i, j)$-th and the $(i, j-1)$-th compensated similarity measures $d'(i, j)$ and $d'(i, j-1)$, each of which is multiplied by a half of the $(i, j)$-th weighting factor $w(i, j)$;
said sum calculating means calculating the sums of the $(i, j)$-th group by two sums which are equal to the $(i-1, j)$-th and the $(i-1, j-1)$-th recurrence values $f(i-1, j)$ and $f(i-1, j-1)$ plus the $(i, j)$-th compensated and weighted similarity measure $d_w'(i, j)$, respectively, and a sum which is equal to the $(i-1, j-2)$-th recurrence value $f(i-1, j-2)$ plus the $(i, j)$-th compensated additional similarity measure $d_a'(i, j)$.

13. A pattern matching device as claimed in claims 8 or 9, further comprising:
means responsive to said first timing signal for totalizing said intervals of time to provide a total duration of said first pattern U; and
means for calculating a product of said total duration and said predetermined value $\delta$ and for adding said product to said overall similarity measure to provide said interpattern similarity measure $D(U, V)$.

14. A pattern matching device as claimed in claim 7, said first means generating said first and said second timing signals with said first timing signal rendered ascendingly consecutively indicative of said first through said I-th instants and with said second timing signals rendered successively indicative of a plurality of ascendingly consecutive instants in said second timing sequence within each of the intervals of time during which said first timing signal indicates one of the instants of said first timing sequence, said prescribed number being three, said previously calculated recurrence values being the $(i-1, j)$-th, the $(i-1, j-1)$-th, and the $(i-1, j-2)$-th recurrence values when said first and said second timing signals are indicative of the $(i, j)$-th pair, wherein said sum calculating means calculates the sums of the $(i, j)$-th group by adding the $(i, j)$-th compensated and weighted similarity measure $d_w'(i, j)$ to the $(i-1, j)$-th, the $(i-1, j-1)$-th, and the $(i-1, j-2)$-th recurrence values $f(i-1, j)$, $f(i-1, j-1)$, and $f(i-1, j-2)$, respectively.

15. A pattern matching device as claimed in claim 7, said first means generating said first and said second timing signals with said first timing signal rendered ascendingly consecutively indicative of said first through said I-th instants and with said second timing signals rendered successively indicative of a plurality of asendingly consecutive instants in said second timing sequence within each of the intervals of time during which said first timing signal indicates one of the instants in said first timing sequence, said prescribed number being three, said previously calculated recurrence values being the $(i-1, j)$-th, the $(i-1, j-1)$-th, and the $(i-1, j-2)$-th recurrence values when said first and said second timing signals are indicative of the $(i, j)$-th pair, wherein:

said second means further comprises sixth means coupled to said first means for calculating, when said first and said second timing signals are indicative of the $(i, j)$-th pair, j-th and $(j-1)$-th intervector spacings in said second timing sequence $t_j$ and $t_{j-1}$ by subtracting the $(j-1)$-th and the $(j-2)$-th instants from the j-th and the $(j-1)$-th instants, respectively;

said fifth means being further coupled to said sixth means for additionally calculating, when said subtracting means calculates the $(i, j)$-th compensated similarity measure, an $(i, j)$-th compensated additional similarity measure $d_a'(i, j)$ by a linear combination of the $(i, j)$-th and the $(j-1)$-th compensated similarity measures $d'(i, j)$ and $d'(i, j-1)$ to which the $(i, j)$-th weighting factor $w(i, j)$ is proportionally distributed in proportion to the j-th and the $(j-1)$-th intervector spacings $t_j$ and $t_{j-1}$, respectively;

said sum calculating means calculating the sums of the $(i, j)$-th group by two sums which are equal to the $(i-1, j)$-th and the $(i-1, j-1)$-th recurrence values $f(i-1, j)$ and $f(i-1, j-1)$ plus the $(i, j)$-th compensated and weighted similarity measure $d_w'(i, j)$, respectively, and a sum which is equal to the $(i-1, j-2)$-th recurrence value $f(i-1, j-2)$ plus the $(i, j)$-th compensated additional similarity measure $d_a'(i, j)$.

16. A pattern matching device as claimed in claim 7, said first means generating said first and said second timing signals with said first timing signal rendered ascendingly consecutively indicative of said first through said I-th instants and with said second timing signal rendered successively indicative of a plurality of ascendingly consecutive instants in said second timing sequence within each of the intervals of time during which said first timing signal indicates one of the instants in said first timing sequence, said prescribed number being three, said previously calculated recurrence values being the $(i-1, j)$-th, the $(i-1, j-1)$-th, and the $(i-1, j-2)$-th recurrence values when said first and said second timing signals are indicative of the $(i, j)$-th pair, wherein:

said fifth means is for additionally calculating, when said subtracting means calculates the $(i, j)$-th compensated similarity measure, an $(i, j)$-th compensated additional similarity measure $d_a'(i, j)$ by a linear combination of the $(i, j)$-th and the $(i, j-1)$-th compensated similarity measures $d'(i, j)$ and $d'(i, j-1)$, each of which is multiplied by a half of the $(i, j)$-th weighting factor $w(i, j)$;

said sum calculating means calculating the sums of the $(i, j)$-th group by two sums which are equal to the $(i-1, j)$-th and the $(i-1, j-1)$-th recurrence values $f(i-1, j)$ and $f(i-1, j-1)$ plus the $(i, j)$-th compensated and weighted similarity measure $d_w'(i, j)$, respectively, and a sum which is equal to the $(i-1, j-2)$-th recurrence value $f(i-1, j-2)$ plus the $(i, j)$-th compensated additional similarity measure $d_a'(i, j)$.

17. A pattern matching device as claimed in any one of claims 14 through 16, wherein said third means further comprises additional means responsive to said overflow signal for keeping generation by said first means of said first and said second timing signals in progress and for discontinuing said generation if said overflow signal always takes and does not always take a predetermined one of said first and said second signal values throughout at least one of the intervals of time, respectively, said predetermined one signal value being said first and said second signal values when said extremum is a minimum and a maximum, respectively.

18. A pattern matching device as claimed in claim 17, wherein said additional means comprises:

means for generating a sequence of timed pulses at the beginnings of said intervals of time, respectively;

means responsive to said overflow signal for producing a pulse signal only when said overflow signal does not always take said predetermined one signal value throughout each of said intervals of time;

output switching means responsive to each of said timed pulses for switching an output signal thereof from a first level to a second level, said output switching means being further responsive to said pulse signal for switching said output signal from said second level back to said first level; and signal pulse producing means responsive to the output signal of said first level for producing one of said timed pulses as a signal pulse for discontinuing said generation, said signal pulse producing means being further responsive to the output signal of said second level for producing none of said timed pulses as said signal pulse to keep said generation is progress.

19. A pattern matching device as claimed in any one of claims 14 through 16, further comprising:

means responsive to said first timing signal for calculating a total duration of said first pattern U by totalizing said intervals of time; and means for calculating said interpattern similarity measure $D(U, V)$ by calculating a product of said total duration and said predetermined value $\delta$ and by adding said product to said overall similarity measure.

20. A pattern matching device as claimed in claim 6, said first means generating said first and said second timing signals with said first timing signal rendered ascendingly consecutively indicative of said first through said I-th instants and with said second timing signal rendered successively indicative of ascendingly consecutive instants in said second timing sequence within each of the intervals of time during which said first timing signal indicates one of the instants in said first timing sequence, said prescribed number being three, said previously calculated recurrence values being the $(i-1, j)$-th, the $(i-1, j-1)$-th, and the $(i-1, j-2)$-th recurrence values when said first and said second timing signals are indicative of the $(i, j)$-th pair, wherein said third means calculates said recurrence formula with the results of calculation given, when said first and said second timing signals are indicative of the $(i, j)$-th pair, by three sums of an $(i, j)$-th group which are equal to the $(i-1, j)$-th, the $(i-1, j-1)$-th, and the $(i-1, j-2)$-th recurrence values $f(i-1, j)$, $f(i-1, j-1)$, and f(i−1, j−2) plus the (i, j)-th compensated and weighted similarity measure $d_w'(i, j)$, respectively.

21. A pattern matching device as claimed in claim 6, said first means generating said first and said second timing signals with said first timing signal rendered ascendingly consecutively indicative of said first through said I-th instants and with said second timing signal rendered successively indicative of ascendingly consecutive instants in said second timing sequence within each of the intervals of time during which said first timing signal indicates one of the instants in said first timing sequence, said prescribed number being three, said previously calculated recurrence values being the (i−1, j)-th, the (i−1, j−1)-th, and the (i−1, j−2)-th recurrence values when said first and said second timing signals are indicative of the (i, j)-th pair, wherein:

said second means further comprises sixth means coupled to said first means for calculating, when said first and said second timing signals are indicative of the (i, j)-th pair, j-th and (j−1)-th intervector spacings of said second timing sequence $t_j$ and $t_{j-1}$ by subtracting the (j−1)-th and the (j−2)-th instants from the j-th and the (j−1)-th instants, respectively;

said fifth means being further coupled to said sixth means for additionally calculating, when said subtracting means calculates the (i, j)-th compensated similarity measure, an (i, j)-th compensated additional similarity measure $d_a'(i, j)$ by a linear combination of the (i, j)-th and the (i, j−1)-th compensated similarity measures $d'(i, j)$ and $d'(i, j−1)$ to which the (i, j)-th weighting factor w(i, j) is proportionally distributed in proportion to the j-th and the (j−1)-th intervector spacings $t_j$ and $t_{j-1}$, respectively;

said third means calculating said recurrence formula with the results of calculation given, when said first and said second timing signals are indicative of the (i, j)-th pair, by three sums of an (i, j)-th group, two of which are equal to the (i−1, j)-th and the (i−1, j−1)-th recurrence values f(i−1, j) and f(i−1, j−1) plus the (i, j)-th compensated and weighted similarity measure $d_w'(i, j)$, respectively, and one of which is equal to the (i−1, j−2)-th recurrence value f(i−1, j−2) plus the (i, j)-th compensated additional similarity measure $d_a'(i, j)$.

22. A pattern matching device as claimed in claim 6, said first means generating said first and said second timing signals with said first timing signal rendered ascendingly consecutively indicative of said first through said I-th instants and with said second timing signal rendered successively indicative of ascendingly consecutive instants in said second timing sequence within each of the intervals of time during which said first timing signal indicates one of the instants in said first timing sequence, said prescribed number being three, said previously calculated recurrence values being the (i−1, j)-th, the (i−1, j−1)-th, and the (i−1, j−2)-th recurrence values when said first and said second timing signals are indicative of the (i, j)-th pair, wherein:

said fifth means is for additionally calculating, when said subtracting means calculates the (i, j)-th compensated similarity measure, an (i, j)-th compensated additional similarity measure $d_a'(i, j)$ by a linear combination of the (i, j)-th and the (i, j−1)-th compensated similarity measures $d'(i, j)$ and $d'(i, j−1)$, each of which is multiplied by a half of the (i, j)-th weighting factor w(i, j);

said third means calculating said recurrence formula with the results of calculation given, when said first and said second timing signals are indicative of the (i, j)-th pair, by three sums of an (i, j)-th group, two of which are equal to the (i−1, j)-th and the (i−1, j−1)-th recurrence values f(i−1, j) and f(i−1, j−1) plus the (i, j)-th compensated and weighted similarity measure $d_w'(i, j)$, respectively, and one of which is equal to the (i−1, j−2)-th recurrence value f(i−1, j−2) plus the (i, j)-th compensated additional similarity measure $d_a'(i, j)$.

23. A pattern matching device as claimed in claim 1, said first means generating said first and said second timing signals with said first timing signal rendered ascendingly consecutively indicative of said first through said I-th instants and with said second timing signal rendered successively indicative of a plurality of ascendingly consecutive instants in said second timing sequence within each of the intervals of time during which said first timing signal indicates one of the instants in said first timing sequence, said prescribed number being three, said previously calculated recurrence values being the (i−1, j)-th, the (i−1, j−1)-th, and the (i−1, j−2)-th recurrence values when said first and said second timing signals are indicative of the (i, j)-th pair, wherein:

said second means further comprises sixth means coupled to said fourth means for calculating, when said fourth means calculates the (i, j)-th weignting factor, an (i, j)-th compensation factor by multiplying the (i, j)-th weighting factor w(i, j) by a predetermined value δ;

said fifth means being further coupled to said sixth means for calculating, when said fourth means calculates the (i, j)-th intervector similarity measure, an (i, j)-th weighted similarity measure $d_w(i, j)$ by multiplying the (i, j)-th intervector similarity measure d(i, j) by the (i, j)-th weighting factor w(i, j) and for subtracting the (i, j)-th compensation factor from the (i, j)-th weighted similarity measure $d_w(i, j)$ to provide an (i, j)-th compensated and weighted similarity measure $d_w'(i, j)$ as the (i, j)-th elementary similarity measure;

said third means calculating said recurrence formula with the results of calculation given, when said first and said second timing signals are indicative of the (i, j)-th pair, by three sums of an (i, j)-th group which are equal to the (i−1, j)-th, the (i−1, j−1)-th, and the (i−1, j−2)-th recurrence values f(i−1, j), f(i−1, j−1), and f(i−1, j−2) plus the (i, j)-th compensated and weighted similarity measure $d_w'(i, j)$, respectively;

said overall similarity measure being related to an interpattern similarity measure D(U, V) representative of whether said first and said second patterns U and V are similar or dissimilar to each other.

24. A pattern matching device as claimed in claim 1, said first means generating said first and said second timing signals with said first timing signal rendered ascendingly consecutively indicative of said first through said I-th instants and with said second timing signal rendered successively indicative of a plurality of ascendingly consecutive instants in said second timing sequence within each of the intervals of time during which said first timing signal indicates one of the instants in said first timing sequence, said prescribed number being three, said previously calculated recurrence values being the (i−1, j)-th, the (i−1, j−1)-th, and the (i−1, j−2)-th recurrence values when said first and said second timing signals are indicative of the (i, j)-th pair, wherein:

said second means further comprises:
sixth means coupled to said first means for calculating, when said first and said second timing signals are indicative of the (i, j)-th pair, j-th and (j−1)-th intervector spacings in said second timing sequence $t_j$ and $t_{j−1}$ by subtracting the (j−1)-th and the (j−2)-th instants from the j-th and the (j−1)-th instants, respectively; and seventh means coupled to said fourth means for calculating, when said fourth means calculates the (i, j)-th weighting factor, an (i, j)-th compensation factor by multiplying the (i, j)-th weighting factor w(i, j) by a predetermined value δ;

said fifth means being further coupled to said sixth means for calculating, when said fourth means calculates the (i, j)-th intervector similarity measure, an (i, j)-th weighted similarity measure $d_w(i, j)$ by multiplying the (i, j)-th intervector similarity measure d(i, j) by the (i, j)-th weighting factor w(i, j) and an (i, j)-th additional similarity measure $d_a(i, j)$ by a linear combination of the (i, j)-th and the (i, j−1)-th intervector similarity measures d(i, j) and d(i, j−1) to which the (i, j)-th weighting factor w(i, j) is proportionally distributed in proportion to the j-th and the (j−1)-th intervector spacings $t_j$ and $t_{j−1}$, respectively, said fifth means being still further coupled to said seventh means for subtracting, when said fourth means calculates the (i, j)-th intervector similarity measure, the (i, j)-th compensation factor from the (i, j)-th weighted similarity measure $d_w(i, j)$ and the (i, j)-th additional similarity measure $d_a(i, j)$ to provide an (i, j)-th compensated and weighted similarity measure $d_w'(i, j)$ as the (i, j)-th elementary similarity measure and an (i, j)-th compensated additional similarity measure $d_a'(i, j)$, respectively;

said third means calculating said recurrence formula with the results of calculation given, when said first and said second timing signals are indicative of the (i, j)-th pair, by three sums of an (i, j)-th group, two of which are equal to the (i−1, j)-th and the (i−1, j−1)-th recurrence values f(i−1, j) and f(i−1, j−1) plus the (i, j)-th compensated and weighted similarity measure $d_w'(i, j)$, respectively, and one of which is equal to the (i−1, j−2)-th recurrence value f(i−1, j−2) plus the (i, j)-th compensated additional similarity measure $d_a'(i, j)$;

said overall similarity measure being related to an interpattern similarity measure D(U, V) representative of whether said first and said second patterns U and V are similar or dissimilar to each other.

25. A pattern matching device as claimed in claim 1, said first means generating said first and said second timing signals with said first timing signal rendered ascendingly consecutively indicative of said first through said I-th instants and with said second timing signal rendered successively indicative of a plurality of ascendingly consecutive instants in said second timing sequence within each of the intervals of time during which said first timing signal indicates one of the instants in said first timing sequence, said prescribed number being three, said previously calculated recurrence values being the (i−1, j)-th, the (i−1, j−1)-th, and the (i−1, j−2)-th recurrence values when said first and said second timing signals are indicative of the (i, j)-th pair, wherein:

said second means further comprises sixth means coupled to said fourth means for calculating, when said fourth means calculates the (i, j)-th weighting factor, an (i, j)-th compensation factor by multiplying the (i, j)-th weighting factor w(i, j) by a predetermined value δ;

said fifth means being further coupled to said sixth means for calculating, when said fourth means calculates the (i, j)-th intervector similarity measure, an (i, j)-th weighted similarity measure $d_w(i, j)$ by multiplying the (i, j)-th intervector similarity measure d(i, j) by the (i, j)-th weighting factor w(i, j) and an (i, j)-th additional similarity measure $d_a(i, j)$ by a linear combination of the (i, j)-th and the (i, j−1)-th intervector similarity measures d(i, j) and d(i, j−1), each of which is multiplied by a half of the (i, j)-th weighting factor w(i, j), and for subtracting the (i, j)-th compensation factor from the (i, j)-th weighted similarity measure $d_w(i, j)$ and the (i, j)-th additional similarity measure $d_a(i, j)$ to provide an (i, j)-th compensated and weighted similarity measure $d_w'(i, j)$ as the (i, j)-th elementary similarity measure and an (i, j)-th compensated additional similarity measure $d_a'(i, j)$, respectively;

said third means calculating said recurrence formula with the results of calculation given, when said first and said second timing signals are indicative of the (i, j)-th pair, by three sums of an (i, j)-th group, two of which are equal to the (i−1, j)-th and the (i−1, j−1)-th recurrence values f(i−1, j) and f(i−1, j−1) plus the (i, j)-th compensated and weighted similarity measures $d_w'(i, j)$, respectively, and one of which is equal to the (i−1, j−2)-th recurrence value f(i−1, j−2) plus the (i, j)-th compensated additional similarity measure $d_a'(i, j)$;

said overall similarity measure being related to an interpattern similarity measure D(U, V) representative of whether said first and said second patterns U and V are similar or dissimilar to each other.

26. A pattern matching device as claimed in any one of claims 20 through 25, wherein said third means comprises:

means responsive to said first and said second timing signals and to the (i, j)-th elementary similarity measures for calculating, when said first and said second timing signals are indicative of the (i, j)-th pair and consequently when said recurrence formula gives the (i, j)-th recurrence value f(i, j), the three sums of the (i, j)-th group;

means responsive to the three sums of the (i, j)-th group for producing an overflow signal which takes first, second, and third signal values when each of the three sums of the (i, j)-th group is greater than a first preselected value, is less than a second preselected value, and is an (i, j)-th restricted sum which, in turn, is neither greater than said first preselected value nor less than said second preselected value, respectively; and means responsive to said overflow signal for providing each of the results of calculation for the (i, j)-th recurrence value f(i, j) by said first and said second preselected values and the (i, j)-th restricted sum when said overflow signal takes said first through said third signal values, respectively.

27. A pattern matching device as claimed in claim 26, further comprising additional means responsive to said overflow signal for keeping generation by said first means of said first and said second timing signals in progress and for discontinuing said generation if said overflow signal always takes and does not always take a predetermined one of said first and said second signal values throughout at least one of the intervals of time, respectively, said predetermined one signal value being said first and said second signal values when said extremum is a minimum and a maximum, respectively.

28. A pattern matching device as claimed in claim 27, wherein said additional means comprises:
means for generating a sequence of timed pulses at the beginnings of said intervals of time, respectively;
means responsive to said overflow signal for producing a pulse signal only when said overflow signal does not always take said predetermined one signal value throughout each of said intervals of time;
output switching means responsive to each of said timed pulses for switching an output signal thereof from a first level to a second level, said output switching means being further responsive to said pulse signal for switching said output signal from said second level back to said first level; and
signal pulse producing means responsive to the output signal of said first level for producing one of said timed pulses as a signal pulse for discontinuing said generation, said signal pulse producing means being further responsive to the output signal of said second level for producing none of said timed pulses as said signal pulse to keep said generation in progress.

29. A pattern matching device as claimed in any one of claims 20 through 25, further comprising:
means responsive to said first timing signal for calculating a total duration of said first pattern U by totalizing said intervals of time; and
means for calculating said interpattern similarity measure D(U, V) by calculating a product of said total duration and said predetermined value $\delta$ and by adding said product to said overall similarity measure.

* * * * *

UNITED STATES PATENT AND TRADEMARK OFFICE
CERTIFICATE OF CORRECTION

PATENT NO. : 4,467,437

DATED : August 21, 1984

INVENTOR(S) : Shichiro TSURUTA, et al

It is certified that error appears in the above-identified patent and that said Letters Patent is hereby corrected as shown below:

Column 5, line 8, insert a --,-- after "measure".

Column 6, line 4, after "overflow", "second" should be --signal--.

Column 7, line 41, "shown" should be --shows--.

line 64, "OVS/a/, OVS/u/," should read -- $\bar{a}$, $\bar{u}$, --.

Column 8, line 57, after "and", insert --the--.

Column 20, line 63, "d[w(i,j)]," should be --$\delta$[w(i, j)],--

Column 22, line 4, "d" should be --d'--.

Column 23, line 8, before "FIG." insert --In--;

line 31, after "overflow" (second occurrence), delete the ",";

line 43, "and", second occurrence, should read -- are --.

UNITED STATES PATENT AND TRADEMARK OFFICE
CERTIFICATE OF CORRECTION

PATENT NO. : 4,467,437

DATED : August 21, 1984

INVENTOR(S) : Shichiro TSURUTA, et al

It is certified that error appears in the above-identified patent and that said Letters Patent is hereby corrected as shown below:

Column 31, line 32, "noe" should be --none--;

line 54, delete "second" (second occurrence).

Column 17, line 10, insert -- and $$c_2(i, j) = t_{j-1}/(t_j + t_{j-1})$$
$$= [q(j - 1) - q(j - 2)]/[q(j) - q(j - 2)]. \quad (15)$$

Signed and Sealed this

Fifth Day of August 1986

[SEAL]

Attest:

DONALD J. QUIGG

Attesting Officer

Commissioner of Patents and Trademarks